United States Patent [19]

Rehklau et al.

[11] Patent Number: 4,512,527
[45] Date of Patent: Apr. 23, 1985

[54] CASSETTE LOADING APPARATUS

[75] Inventors: George D. Rehklau, Los Altos; Lee A. Cotterill, San Jose; Robert Z. Langevin, Los Gatos, all of Calif.

[73] Assignee: Electro-Sound, Inc., Sunnyvale, Calif.

[21] Appl. No.: 436,051

[22] Filed: Oct. 22, 1982

[51] Int. Cl.³ .................. B65H 19/26; B65H 21/00
[52] U.S. Cl. ..................... 242/56 R; 156/506
[58] Field of Search ............... 242/56 R, 75.3; 226/198, 196; 156/506, 502, 505, 510; 188/379; 384/121

[56] References Cited

U.S. PATENT DOCUMENTS

| | | | |
|---|---|---|---|
| 2,686,015 | 8/1954 | Stevens | 242/56 A |
| 3,486,585 | 12/1969 | Richter et al. | 188/379 |
| 3,582,009 | 6/1971 | Ceroll | 242/56 R |
| 3,637,153 | 1/1972 | King | 242/199 X |
| 3,825,461 | 7/1974 | Gorman | 156/506 X |
| 3,917,184 | 11/1975 | King | 242/58.1 X |
| 4,062,719 | 12/1977 | Masuzima et al. | 156/506 X |
| 4,113,196 | 9/1978 | Rehklau | 156/506 X |
| 4,332,355 | 6/1982 | Zopfy et al. | 242/56 R |
| 4,430,145 | 2/1984 | Berube | 242/56 R X |
| 4,440,358 | 4/1984 | Ryan et al. | 242/75.3 X |

Primary Examiner—Stuart S. Levy
Assistant Examiner—Leo J. Peters
Attorney, Agent, or Firm—Claude A. S. Hamrick

[57] ABSTRACT

A multistation cassette loading apparatus 10 loads a predetermined amount of blank or pre-recorded magnetic tape into cassettes 12. Cassettes to be loaded are oriented and positioned on a conveyor 16 by an automatic feed mechanism 14. A loading mechanism 18 transfers each cassette to the first station of a four station turntable 20. At the first station, the leader tape 320 of the cassette is extracted. At the second station, the leader is oriented in a splice block 24 and is held in place by vacuum. The leader tape is cut into two sections of equal length by a cutter 34. At the third station, one section of the leader tape is spliced to the end of a reel of supply tape 38 by a splicer 40. A measured amount of supply tape is wound into the cassette at a constant tension. A cushion of air blown around the reel of tape in the cassette during winding reduces frictional heating from tape drag. After the measured amount of tape is loaded into the cassette, the supply tape is cut by another cutter 46. At the fourth station, the cut end of the supply tape is spliced to the other section of the leader tape by splicer 48. After the excess tape is wound into the cassette, it is unloaded from the turntable.

52 Claims, 39 Drawing Figures

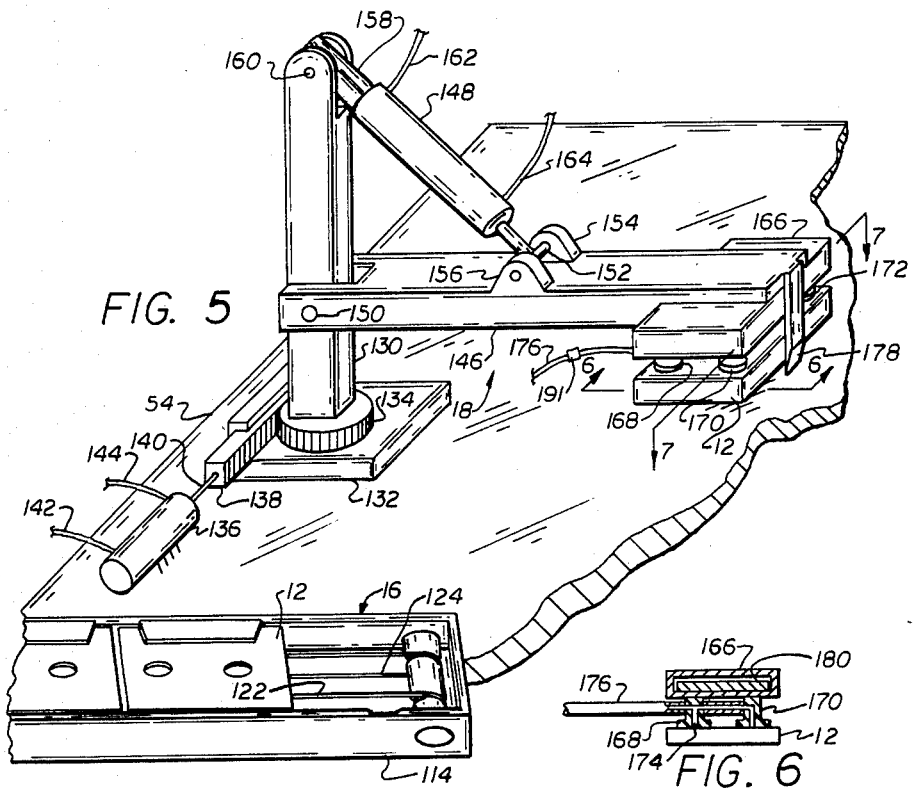
FIG. 5
FIG. 6
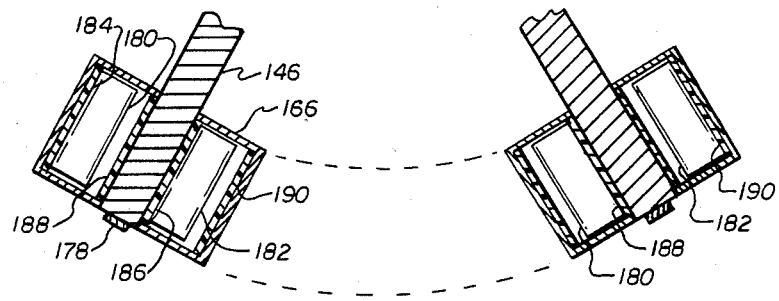
FIG. 7

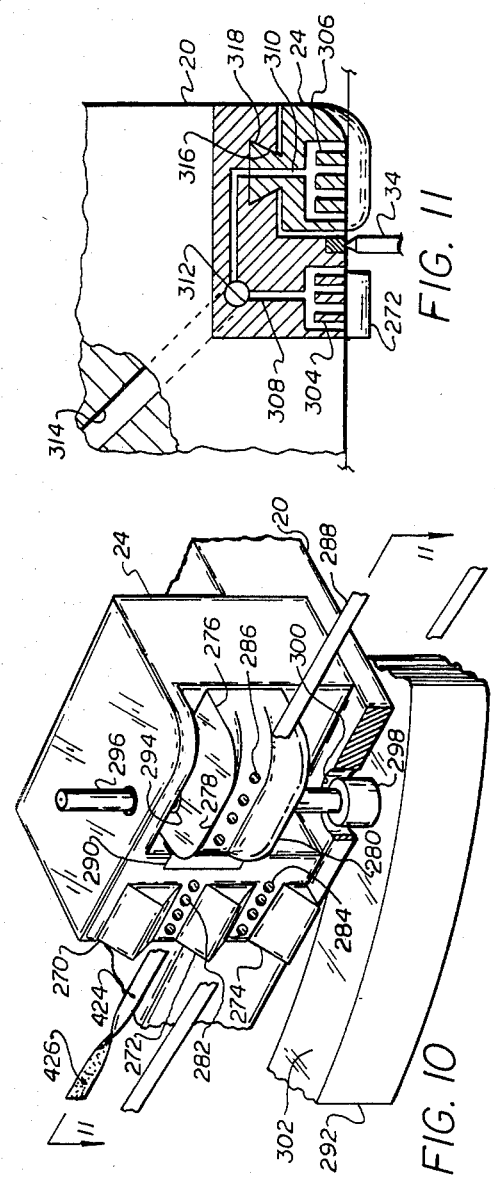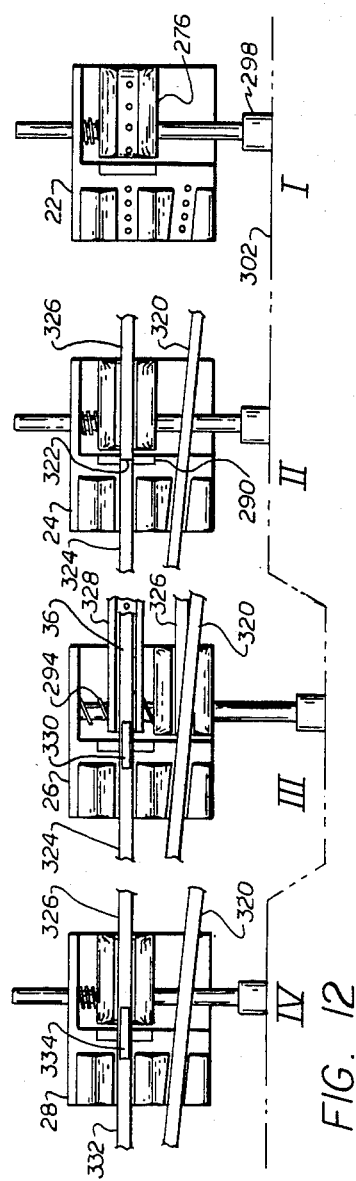

| COMPONENT | STATUS | | REFERENCE NUMBER |
|---|---|---|---|
| | X | BLANK | |
| CASSETTE LOADER | TURNTABLE | CONVEYOR | 136 |
| ARM POSITION | DOWN | UP | 148 |
| VACUUM | ON | OFF | 176 |
| VACUUM SENSOR | SENSE | OFF | 191 |
| STATION I MOTOR | ON | OFF | 342 |
| SPINDLE POSITION | UP | DOWN | 346 |
| TAPE EXTRACTION CHAMBER | IN | OUT | 392 |
| ORIENTATION | FLIPPED | UPRIGHT | 362 |
| VACUUM | ON | OFF | 374 |
| AIR | ON | OFF | 374 |
| PIN | EXTENDED | RETRACTED | 378 |
| LOOP SEPARATOR | DOWN | UP | 412 |
| AIR | ON | OFF | 428 |
| TURNTABLE DRIVE | ADVANCE 20 | RESET | 204/208 |
| STATION II VACUUM SENSOR | SENSE | OFF | 267 |
| STATION II CUTTER | CUT | RESET | 442 |
| STATION III VACUUM SENSOR | SENSE | OFF | 269 |
| TAPE SUPPLY ARM | IN | OUT | 656 |
| VACUUM | ON | OFF | 662 |
| AIR | ON | OFF | 662 |
| STATION III SPLICER | SPLICE | RESET | 458 |
| SPLICE TAPE FEED | ADVANCE | RESET | 476 |
| CUTTER | CUT | RESET | 528 |
| LEADER CLAMP | CLAMP | RELEASE | 536 |
| AIR BLOWER, POSITION | DOWN | UP | 578 |
| AIR FLOW | ON | OFF | 590 |
| STATION III MOTOR | ON | OFF | 544 |
| SPINDLE POSITION | UP | DOWN | 560 |
| POSITION SENSOR | SENSE | OFF | 589 |
| LOOP FORMER | ON | RESET | 604 |
| STATION III CUTTER | CUT | RESET | 613 |
| STATION IV CASSETTE SENSOR | SENSE | OFF | 629 |
| STATION IV MOTOR | ON | OFF | 627 |
| SPINDLE POSITION | UP | DOWN | 625 |
| STATION IV SPLICER | SPLICE | RESET | 615 |
| SPLICE TAPE FEED | ADVANCE | RESET | 617 |
| CUTTER | CUT | RESET | 619 |
| STATION IV VACUUM | ON | OFF | 252 |
| CASSETTE UNLOADER | TURNTABLE | SORTER | 614 |
| ARM | DOWN | UP | 631 |
| VACUUM | ON | OFF | 633 |

FIG 36(a)

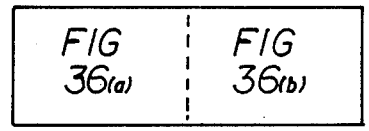

FIG. 36(b)

| FIG. 36(a) | FIG. 36(b) |

CASSETTE LOADING APPARATUS

BACKGROUND OF THE INVENTION

A. Field of the Invention

This invention relates generally to tape loading apparatus and more particularly to a high speed, precision machine for automatically loading a pre-determined amount of magnetic tape into a cassette.

B. Description of the prior art

Various devices have been used in the past to wind magnetic tape onto the reels of tape containers known as cassettes. These devices typically loaded tape from a supply reel into cassettes having a short length of leader tape fastened to both reels. Standard practice has been to sequentially (a) extract the leader from the cassette, (b) cut the leader tape into two sections, (c) splice one leader section to the supply tape, (d) wind a selected length of supply tape onto one of the reels of the cassette, (e) cut the supply tape, (f) splice the supply tape to the other leader section, and (g) wind the tape containing the second splice into the cassette.

One problem with prior art cassette loading devices was that cassettes were processed one at a time. Steps (a) through (g) were sequentially performed on each cassette at a single station. The cycle time per cassette was relatively high since all seven steps had to be performed within the cycle. Another problem with such devices was that the winding speed was restricted by thermal effects from frictional heating caused by the tape rubbing against the cassette during winding. This restriction also contributed to high cycle time. As a result, productivity suffered.

SUMMARY OF THE PRESENT INVENTION

Accordingly, it is a primary object of the present invention to provide cassette loading apparatus with improved cycle time by utilizing multistation processing to perform the required steps in parallel.

Another object of the present invention is to provide a mechanism for winding a reel of tape that includes means for suspending the reel of tape on a cushion of air to reduce friction.

A further object of the present invention is to provide a high speed tape winding mechanism that winds tape at a constant tension.

Still another object of the present invention is to provide improved tape splicing means.

A still further object of the present invention is to provide apparatus for extracting the leader from a cassette and for orienting the leader so as to permit splicing to the inside of the tape.

Another object of the present invention is to provide a cassette handling mechanism that includes means for damping oscillations.

Still another object of the present invention is to provide means for orienting and positioning cassettes on a conveyor.

These and other objects, which will hereinafter become apparent, are accomplished in accordance with the illustrated preferred embodiment of the present invention by providing a multistation cassette loading apparatus. Cassettes to be loaded are oriented and positioned on a conveyor by an automatic feed mechanism. A loading mechanism transfers each cassette to the first station of a four station turntable. At the first station, the leader tape of the cassette is extracted. At the second station, the leader is oriented in a splice block and held in place by vacuum. The leader tape is cut into two sections of equal length by a cutter. At the third station, one section of the leader tape is spliced to the end of a reel of supply tape. A measured amount of supply tape is wound into the cassette at a constant tension. A cushion of air blown around the reel of tape in the cassette during winding reduces frictional heating from tape drag. After the measured amount of tape is loaded into the cassette, the supply tape is cut by another cutter. At the fourth station, the cut end of the supply tape is spliced to the other section of the leader tape. After the excess tape is wound into the cassette, it is unloaded from the turntable.

Among the several advantages of the present invention is that it rapidly and automatically loads a measured amount of tape into cassettes.

Another advantage of the present invention is that it processes several cassettes in parallel, thus improving production throughput.

Still another advantage of the present invention is that it utilizes an air bearing to suspend the reel of tape in the cassette as it is being wound, thereby reducing frictional heating and permitting a faster winding speed.

These and other objects of the present invention will no doubt become apparent to those skilled in the art after having read the following detailed description of a preferred embodiment which is illustrated in the several figures of the drawing.

BRIEF DESCRIPTION OF THE DRAWINGS

FIG. 5 is a perspective view of a cassette loader mechanism utilized with the loading apparatus of FIG. 1.

FIG. 6 is a sectional view through a pickup head used with the loader mechanism of FIG. 5.

FIG. 7 is a sectional view of the loading apparatus of FIG. 5 showing the relative positions of sliding masses.

FIG. 10 is a perspective view of one of four splice blocks affixed to the turntable FIG. 8.

FIG. 11 is a plan view in section of one of four splice blocks of FIG. 10, and shows an interconnecting network of vacuum passages.

FIG. 12 is a side view of the four splice blocks of FIG. 10 showing the relative positions of the leader tape and the magnetic tape at each station of the loading apparatus of FIG. 1.

FIG. 36 is a timing diagram of the loading apparatus of FIG. 1.

DESCRIPTION OF THE PREFERRED EMBODIMENT

A. General Description

Figure 1:
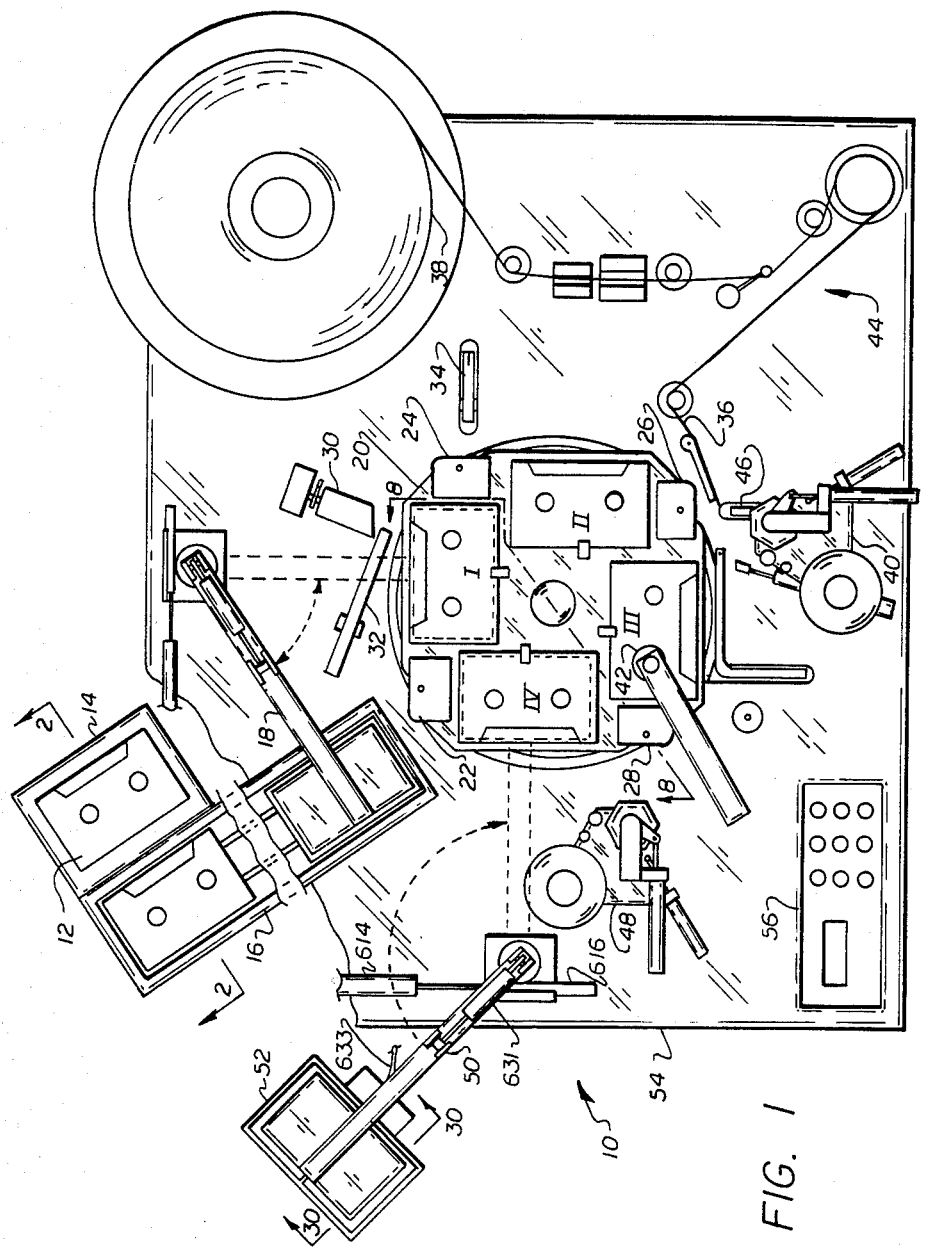
FIG. 1 is an overall plan view of a cassette loading apparatus according to the present invention. Magnetic tape is loaded into cassettes by the loading apparatus at four stations: I, II, III, and IV.

In reference now to FIG. 1, there is shown a cassette loading apparatus 10 according to the present invention.

The purpose of the loading apparatus is to load a predetermined length of magnetic tape into a cassette containing a short length of leader tape attached to the tape reels of the cassette. Generally, the process of loading tape involves several steps including the following: extracting the leader tape from the cassette, cutting the leader tape, splicing the magnetic tape to one of the cut ends of the leader tape, winding the predetermined length of magnetic tape onto one tape reel, cutting the magnetic tape, and splicing the magnetic tape to the other cut end of the leader tape. During this process, certain conditions are monitored to insure proper quality control.

More specifically, a stack of cassettes 12 to be loaded with magnetic tape are positioned in a hopper 14. Each cassette has, at this point, a short length of leader tape attached to its tape reels. Upon demand, cassettes are fed to one end of a conveyor 16 by the hopper. At the other end of the conveyor, a loading mechanism 18 picks up a cassette and transfers it to station I of a four station rotary turntable 20. Each of the four stations of the turntable has an associated splice block 22, 24, 26, and 28. These splice blocks position the leader tape and the magnetic tape for cutting and splicing.

At station I, a leader extraction chamber 30 uses vacuum to suck the leader tape from the cassette 12. A loop separator 32 lowers one portion of the leader tape for later positioning on splice block 22. The leader pullout chamber rotates to twist the leader tape to enable the subsequent splicing operations to be performed on the inner side of the tape. The turntable is now ready to index by a quarter of a revolution.

As the turntable rotates, the cassette at station I moves toward station II. As the splice block next to the cassette moves toward its position at station II, it contacts and positions the leader tape that was extracted by extraction chamber 30. When the turntable indexing is complete, the leader tape from the cassette at station II is properly oriented on splice block 24, whereupon the extraction chamber and the loop separator 32 reset and await the loading of another cassette at station I. At station II, a first cutter 34 cuts the leader tape held by splice block 24.

The turntable 20 indexes once again, bringing the cassette 12 to station III. At station III, magnetic tape 36 from a supply reel 38 is spliced to one cut end of the leader tape by a first tape splicer mechanism 40. A predetermined length of magnetic tape is then wound at high speed onto one tape reel of the cassette using an air blower 42 to provide an air cushion between the tape and the cassette. A tape transport mechanism 44 measures the length of tape, which may be either blank or pre-recorded, and controls tape tension during the winding process. At the conclusion of the tape winding process, the magnetic tape is cut by a second cutter 46, and the turntable rotates another quarter revolution.

At station IV, a second tape splicing mechanism 48 splices the cut end of the magnetic tape with the other cut end of the leader tape. An unloading mechanism 50, which operates like loading mechanism 18, unloads the cassette 12 from the turntable. The now loaded cassette is dropped into a sorter 52 which directs it to a reject pile if the loading apparatus 10 has detected any processing problems.

The cassette loading apparatus 10 is disposed horizontally on a deck plate 54. The apparatus includes a control panel 56 at which values of tape length and other parameters are selected by an operator. The control panel also includes output indicators for process monitoring.

B. Conveyor System

Figure 2:
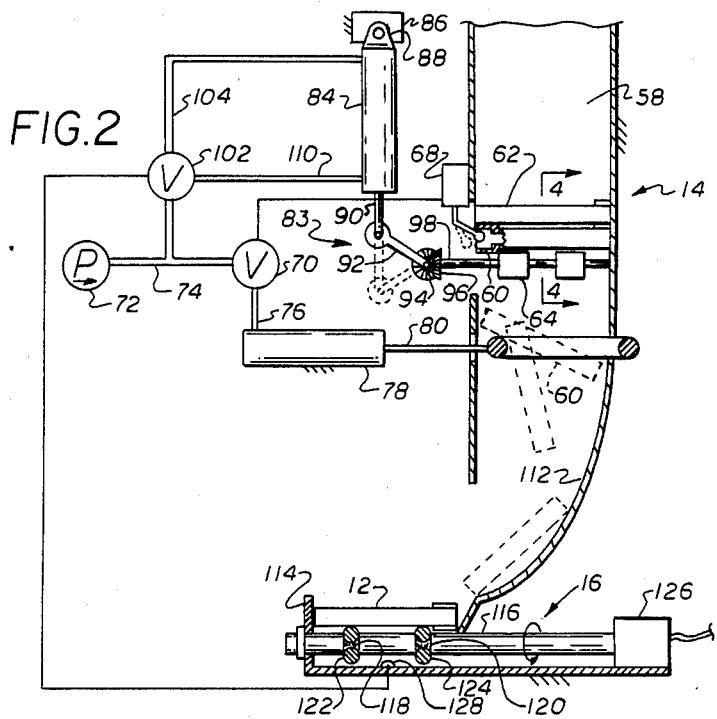
FIG. 2 is a schematic and sectional view of a hopper and conveyor utilized for supplying cassettes to the loading apparatus of FIG. 1.
Figure 3:
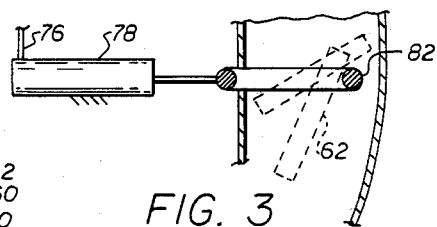
FIG. 3 is a sectional view of a cassette flipping mechanism employed with the hopper of FIG. 2.
Figure 4A:
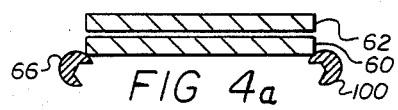
FIG. 4 is a sectional view of a cassette feed mechanism employed with the hopper of FIG. 2.
Figure 4B:
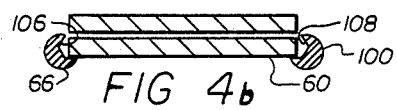
Figure 4C:
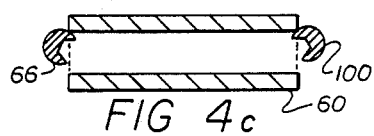

FIGS. 2, 3, and 4 show details of the construction and operation of the hopper 14 and the conveyor 16 which supply cassettes 12 to the loading mechanism 18. The purpose of the hopper is to supply, upon demand, properly oriented cassettes to the conveyor. Accordingly, the hopper includes an area 58 for stacking cassettes 60 and 62. The lowermost cassette 60 rests on dogs 64 and 66 and supports all of the other cassettes 62 in the stack. An orientation sensor 68 detects whether the open face of cassette 60 is toward the sensor or away from the sensor. All cassettes positioned with their open faces toward the sensor must be flipped for proper orientation. When the orientation sensor detects a cassette such as cassette 60 that must be flipped, the sensor actuates a valve 70. Valve 70 allows compressed air from pump 72 to flow through tubing 74 and 76 to cylinder 78. Rod 80 of cylinder 78 extends, which in turn shifts a flip bar 82 to the position shown in FIG. 2.

A feed mechanism 83 drops the lowermost cassette 60 from the stack upon demand. Air cylinder 84 is mounted to a fixed block 86 by a clevis 88 to allow rotation. The rod 90 of cylinder 84 is pivotably coupled to a crank 92 which is in turn coupled to a bevel gear 94. Bevel gear 94 acts through a mating gear 96 to rotate a shaft 98 and dogs 64 and 66 as crank 92 rotates. A corresponding pair of dogs 100 are disposed on the opposite side of the hopper from dogs 64 and 66 and are driven in a similar fashion.

FIG. 4 shows the sequence of operation of the feed mechanism 83 that results in dropping one cassette 60 to the conveyor 16. To feed a cassette 12 to the conveyor, valve 102 supplies compressed air first to the piston side of cylinder 84 through tubing 104. Rod 90 extends, causing crank 92 to pivot downward. Gears 94 and 96 and corresponding gears on the opposite side of the hopper rotate the dogs 66 and 100 to the position shown in FIG. 4b. This allows the lowermost cassette 60 to drop into the vee notches 106 and 108 of the dogs. Valve 102 then shifts pressure to tubing 110, causing the rod to raise the crank. This in turn resets the dogs and allows cassette 60 to drop.

As cassette 60 drops into a chute 112 below the feed mechanism 83, it strikes the flip bar 82 and flips to the proper orientation. The cassette slides down the chute and onto the conveyor 16. When a cassette such as cassette 62 is already properly oriented, valve 70 closes and an internal spring retracts rod 80 of cylinder 78. This moves the flip bar to the position shown in FIG. 3 which permits cassette 62 to drop without flipping.

The conveyor 16 is of conventional design and includes a frame 114 and a shaft 116 with grooves 118 and 120 for two belts 122 and 124 of circular cross section. Motor 126 rotates shaft 116 which drives the belts and cassettes 12 positioned thereupon toward the loading apparatus 10. A photodetector 128 is provided to sense the absence of a cassette at the hopper end of the conveyor. The photodetector directs valve 102 to feed cassettes as required to fill the conveyor.

C. Cassette Loader

The loading mechanism 18 transfers cassettes 12 from the conveyor 16 to station I of the turntable 20; see FIG. 5. The loading mechanism pivots from the conveyor to the turntable about a vertical axis. A vertically disposed riser 130 is pivotably attached to the deck plate 54 by a base 132. A gear 134 is affixed to the lower portion of the riser at the vertical axis. An air cylinder 136 mounted to the deck plate and a rack gear 138 attached to the cylinder rod 140 and meshed with gear 134 provide means for pivoting the riser. Compressed air supplied through tubing 142 or 144 moves rod 140 and rack gear 138, thereby rotating gear 134 and riser 130.

Vertical motion of the loading mechanism 18 is necessary to lift the cassette 12 from the conveyor 16 and to provide clearance for movement to the turntable 20. An arm 146 that is pivotably attached to the riser 130 and an air cylinder 148 act to provide the required vertical motion. The arm is attached to the lower portion of the riser by a pin 150 that mounts through both the arm and the riser. The rod of cylinder 148 is attached to a pin 152 that spans the distance between two ears 154 and 156 disposed at the mid-point of arm 146. The other end of cylinder 148 is a clevis mount 158 that pivots about a pin 160 at the top of the riser. Compressed air supplied to cylinder 148 through tubing 162 or 164 causes the cylinder to lower or raise the arm as required.

The loading mechanism 18 has a suction head 166 located at the end of arm 146 to provide means for grasping the cassette 12. Four suction cups 168, 170, and 172 (fourth not visible) are disposed at the four corners of the underside of the suction head. Each suction cup is fabricated from a compliant material such as rubber and includes a vent 174 for evacuating the air from between the suction cup and the cassette; see FIG. 6. A vacuum supply tube 176 connects to each of the vents of the suction cups and, when evacuated, permits the suction head to grasp a cassette. A hook deflector 178 is disposed at the end of the arm and protrudes below the underside of cassette 12. The purpose of the hook deflector is to permit the cassette to be loaded onto the turntable 20.

One problem that arises from the useage of air cylinders such as cylinder 136 to rotate the loading mechanism 18 is that the air in the cylinder acts as a spring that permits the mechanism to oscillate. These oscillations must cease before the mechanism can lower the arm 146. In the present invention, damping is provided by two sliding masses 180 and 182 located within the suction head 166. FIG. 7 shows the operation of this damping system. When the loading mechanism pivots clockwise to the conveyor 16, the sliding masses slide a short distance, then impact cushions 184 and 186, repectively within the suction head. When the loading mechanism pivots counterclockwise to the turntable, the sliding masses slide the short distance, then impact cushions 188 and 190, respectively. The sliding of the masses plus the impact into the cushions provide a damping effect that eliminates the undesirable oscillations.

In operation, the loading mechanism 18 transfers cassettes 12 from the conveyor 16 to the turntable 20. Cylinder 136 extends rack 138, causing riser 130 to pivot to position the suction head 166 over the conveyor. Cylinder 148 lowers arm 146 until the suction cups touch the cassette. Vacuum is turned on in tube 176 permitting the suction cups to grasp the cassette. Cylinder 148 then raises arm 146 and a sensor 191 detects the level of vacuum in tube 176, thereby sensing the presence of a cassette. If no cassette is present, the loading mechanism stops. If a cassette is detected, cylinder 136 rotates the riser until the head is above the turntable. Cylinder 148 then extends, lowering the arm and the cassette to the turntable. Vacuum is then turned off in tube 176, permitting the cassette to remain on the turntable as cylinder 148 lifts the arm. The loading mechanism is at this point ready to begin another cycle.

D. Turntable

The function of the turntable 20 is to sequentially position a cassette 12 at each of four stations. Once a cassette is loaded onto the turntable at station I by the loading mechanism 18, it remains affixed to the turntable through three sucessive ninety degree rotations in the clockwise direction until it is unloaded from the turntable at station IV. The four splice blocks 22, 24, 26, and 28 attached to the turntable act to position the leader tape and magnetic tape for cutting and splicing operations at stations II, III, and IV. The turntable provides a vacuum distribution system as well as a mounting platform for the splice blocks.

Figure 8:
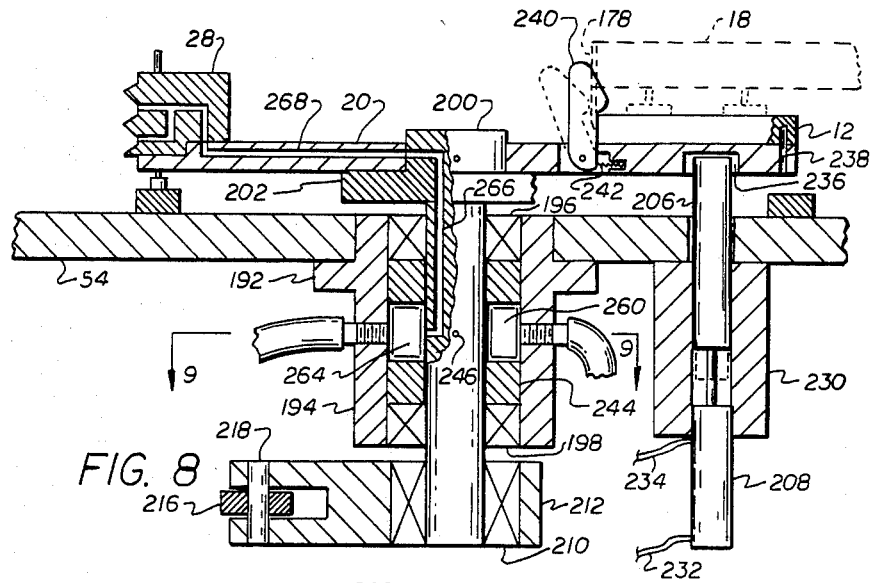
FIG. 8 is a sectional view of a turntable and its drive mechanism utilized with the loading apparatus of FIG. 1.
Figure 9:
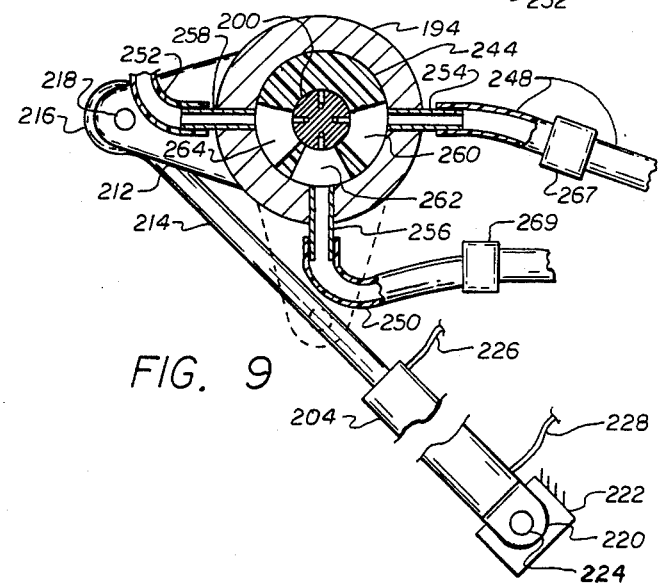
FIG. 9 is a sectional view through the drive mechanism of FIG. 8.

With reference now to FIGS. 8 and 9, the turntable drive system will now be described. A flange 192 of a housing 194 is bolted or otherwise fastened to the center of the deck plate 54. Two rotary bearings 196 and 198 permit a shaft 200 disposed within to rotate about a vertical axis. A flange 202 disposed proximate the top of shaft 200 is bolted or otherwise fastened to the center of the turntable 20.

Each advance of the turntable 20 must be precisely ninety degrees. This is accomplished by the use of a driving air cylinder 204 and a locating pin 206 positioned by another air cylinder 208. Cylinder 204 is coupled to shaft 200 through a rotary clutch 210 that freely rotates in one direction and locks the shaft to the rotation of an arm 212 in the other direction. A rod 214 of cylinder 204 has a rod end 216 that pivotably attaches to arm 212 with a pin 218. A clevis 220 formed in the mounting end of cylinder 204 attaches to a fixed block 222 with a pin 224. This type of mounting permits cylinder 204 to pivot about pin 224 as it rotates arm 212. Compressed air is supplied to cylinder 204 through tubing 226 and 228 when required to advance the turntable.

The locating pin 206 is guided by and its cylinder 208 is attached to a guide block 230 that is affixed to deck plate 54. Locating pin 206 is raised and lowered by cylinder 208 according to the pressure of air present in tubing 232 and 234 coupled to the ports of cylinder 208. Four bearing faces 236, each spaced at precisely ninety degrees, are provided in the underside of turntable 20 for bearing against the locating pin for turntable positioning.

When the turntable is to be advanced, cylinder 204 retracts arm 212 to the position shown in dashed lines in FIG. 9. Since this is a counterclockwise revolution, shaft 200 and turntable 20 do not rotate. The locating pin 206 is then lowered by cylinder 208, unlocking the turntable. Cylinder 204 then advances arm 212, rotating shaft 200 and turntable 20 in a clockwise direction. After the turntable has begun to rotate but before it has advanced by ninety degrees, cylinder 208 raises the locating pin. The turntable continues to rotate until the bearing face 236 contacts the locating pin. A clockwise force on the turntable generated by cylinder 204 holds the bearing face against the locating pin. The turntable remains in this position until another rotation is required. All forces from cutters and splicers striking the splicing block 24, 26, and 28 are counterclockwise in direction and, accordingly, bear against the force of cylinder 204, not the location pin Each station of the turntable 20 securely positions each cassette 12 loaded by the loading mechanism 18. Each station has two short vertical pins 238 that engage holes in the cassette for positioning. A hook 240 is provided at each station to clamp the cassette against the top surface of the turntable and to bias it toward the pins. When the loading mechanism is loading a cassette onto station I of the turntable, the hook deflector 178 pivots the hook against a coil spring 242 to seat the cassette on the pins. When the head 166 of the loading mechanism is raised, the coil spring forces the finger to rotate to its clamping position.

The turntable 20 distributes vacuum to the splice blocks 24, 26, and 28 at stations II, III, and IV. Splice block 22 at station I does not require vacuum. To distribute vacuum to the splice blocks and to permit independent monitoring of the vacuum pressure at each splice block, a vacuum distribution valve 244 is used. The vacuum distribution valve is stationary within the housing 194 and connects vacuum to three of four ports 246 in shaft 200. Vacuum tubing 248, 250, and 252 is connected to three fittings 254, 256, and 258 attached to housing 194. Each fitting opens onto a vacuum chamber 260, 262, and 264, respectively, formed by the vacuum distribution valve. Chamber 264, for example, connects vacuum to the station IV splice block 28 through an axial passage 266 within shaft 200 and a radial passage 268 within turntable 20. When the turntable advances ninety degrees, shaft 200 rotates, thus closing off the vacuum to the splice block that moves to station I. Similarly, when the turntable rotates once again, that splice block is connected to chamber 260 as it moves to station II. Vacuum sensors 267 and 269 sense the vacuum in tubing 248 and 250, respectively. A high vacuum reading from sensors 267 or 269 indicates the presence of tape at the corresponding splice block 24 or 26.

Turning to FIGS. 10, 11, and 12, the splice block 24 and its operation will now be described. As shown in FIG. 10, the splice block has three tap guides 270, 272, and 274 disposed on one side of its outer face. Shuttle block 276 is located on the other side of the outer face of the splice block. Two tape guides 278 and 280 are disposed on the outer face of the shuttle block. Between each adjacent pair of tape guides are rows of vacuum ports 282, 284, and 286 in the splice block face and in the shuttle block. Leader or magnetic tape 288 is positioned on the faces of the splice block and the shuttle block between adjacent pairs of tape deflectors and held in place by vacuum applied to the vacuum ports from within. Inserted into the face of the splice block is a cutting pad 290 which is composed of a hardened material.

The shuttle block 276 is vertically positioned according to a cam ring 292. The shuttle block is biased downward by a coil spring 294 located between the shuttle block and the top of the splice block 24. A vertical shaft 296, affixed to the shuttle block, is terminated at its lower end with a contact pad 298. A clearance hole 300 in the turntable 20 permits the contact pad to protrude through the bottom of the turntable to rest on the upper surface 302 of a cam ring 292. The cam ring is circular in shape and is affixed to the deck plate 56. The height of surface 302 above the deck plate determines the vertical position of the shuttle block.

FIG. 11 shows the vacuum ducting within the splice block 24. Manifolds 304 and 306 distribute vacuum to ports 282 and 286, respectively. Vacuum is connected to the manifolds through passages 308 and 310 that connect to a vertical passage 312 which in turn connects to a radial passage 314 in the turntable. A mating pair of dovetails 316 and 318 permit vertical motion of the shuttle block 276 while maintaining vacuum to ports 286.

As a cassette 12 moves from station to station on the turntable 20, the splice block positions the leader tape and the magnetic tape for various operations at each station, as shown in FIG. 12. The station I splice block 22 is unused and thus does not have any tape associated with it. The shuttle block 276 is in its upper position at station I. As the turntable rotates, the shuttle block picks up the leader tape 320 extracted at station I.

Upon reaching station II, the splice block 24 holds leader tape in place by vacuum through ports 282, 284, and 286. While at station II, the leader tape is cut along line 322 on the cutting pad 290 to separate it into a first end 324 and a second end 326. At station II, the shuttle block 276 remains at its upper position.

The turntable rotates once again to move the cassette 12 to station III. The upper surface 302 of the cam 292 drops in height, moving the shuttle block 276 to its lower position and lowering the second end 326 of the leader tape. At station III, a tape positioning arm 328 moves one end of the magnetic tape 36 adjacent to the first end 324 of the leader tape. A piece of splicing tape 330 is applied to join the magnetic tape to the first end of the leader tape. After the magnetic tape is wound into the cassette, the trailing end 332 of the magnetic tape is cut at the cutting pad.

As the turntable rotates to bring the cassette to station IV, the shuttle block 276 returns to its upper position. Another splice 334 is applied to join the trailing end 332 of the magnetic tape to the second end 326 of the leader tape. After the loose tape is wound, the cassette is ready to be unloaded.

In summary, the splice blocks 22, 24, 26, and 28 position the leader tape and the magnetic tape for cutting and splicing operations at stations II, III, and IV.

Figure 13:
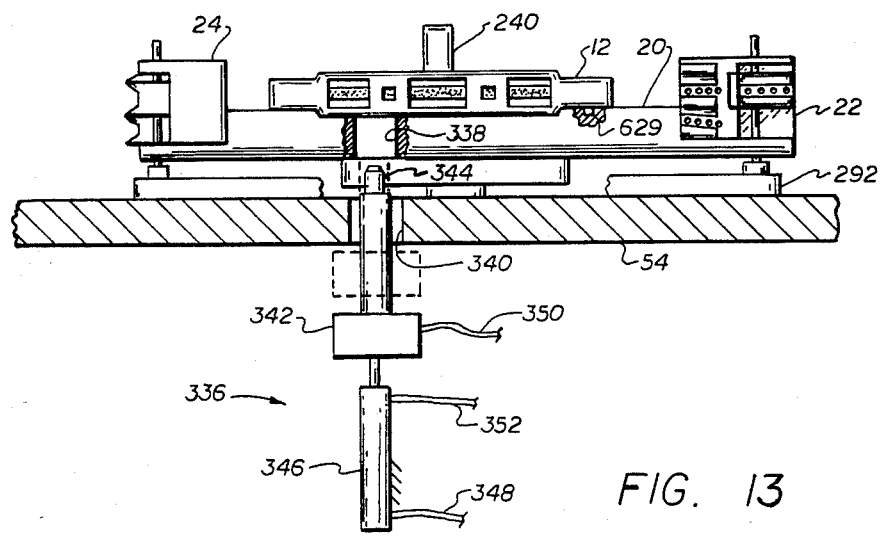
FIG. 13 is a side view partially in section of a tape winding motor employed at stations I and IV of the loading apparatus of FIG. 1.

E. Station I (See FIG. 13)

Cassettes are first loaded onto the turntable 20 at station I. At station I, the leader tape 320 is extracted from the cassette 12 and is twisted for proper orientation on the splice block. The first processing step at station I after a cassette is loaded is to wind the excess leader tape onto one reel of the cassette. This allows the leader tape to be cut in two equal halves. To accomplish this, a winding mechanism 336 is utilized. The winding mechanism is disposed below the turntable and gains access to the cassette through holes 338 and 340 in the turntable and the deck plate 54, respectively. An electric motor 342 with a spindle 344 attached provides the means to wind the leader tape. A fixed air cylinder 346 is disposed below the motor for the purpose of raising and lowering the motor and spindle. At the appropriate time, compressed air in tubing 348 causes cylinder 346 to raise the motor and spindle. Electric power supplied through wire 350 turns the motor and spindle, winding the excess leader tape onto one reel. After winding, compressed air in tubing 352 causes cylinder 346 to lower the motor and spindle.

Figure 14:
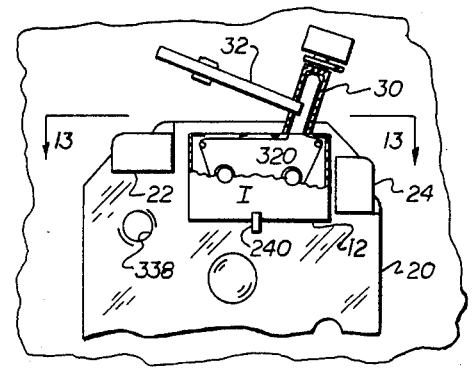
FIG. 14 is a plan view of station I of the loading apparatus of FIG. 1 and shows the first step in extracting the leader tape of a cassette.

The second processing step at station I is to extract the leader tape from the cassette 12; see FIG. 14. The leader extraction chamber 30 is moved to the cassette and the chamber is evacuated. This sucks the leader tape out of the cassette and into the chamber.

Figure 15:
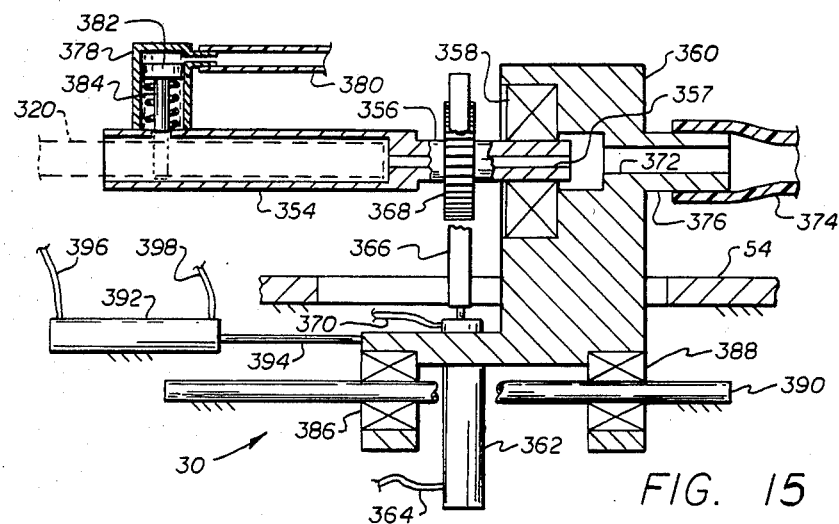
FIG. 15 is a sectional view of a leader extraction chamber utilized at station I of the loading apparatus of FIG. 1.

FIG. 15 shows the construction details of the leader extraction chamber 30. It includes an open-ended vacuum chamber 354 into which the leader tape is sucked. The end of the vacuum chamber opposite to the open end is formed as a shaft 356 with a passage 357 along its axis. A rotary bearing 358 is mounted on the end of the shaft and permits the vacuum chamber to rotate about the axis of the shaft. A housing 360 provides a mounting for the rotary bearing as well as for an air cylinder 362. Compressed air in tubing 364 connected to the piston side of cylinder 362, causes the cylinder to raise a rack 366 which in turn rotates a gear 368 affixed to shaft 356, thus rotating vacuum chamber 354. To upright the vacuum chamber, compressed air is supplied to the rod side of cylinder 362 through tubing 370.

Vacuum to the vacuum chamber 354 is supplied through a passage 372 within housing 360 by a vacuum hose 374 fitted to a nipple 376. A small spring return air cylinder 378 is disposed proximate the open end of the vacuum chamber. Compressed air in tubing 380 acts on piston 382 to lower a pin 384 into the vacuum chamber. Pin 384 is utilized to retain the leader tape 320 within the vacuum chamber during chamber rotation.

The leader extraction chamber 30 is disposed for horizontal translation toward and away from the turntable 20. Two linear bearings 386 and 388 are affixed to the lower portion of housing 360 and permit chamber 30 to slide along a fixed guide rod 390. Means for propelling chamber 30 along rod 390 is provided by a fixed air cylinder 392 having a rod 394 coupled to the housing. Compressed air supplied to cylinder 392 through tubing 396 and 398 causes the cylinder to move the housing along the guide rod.

Figure 16:
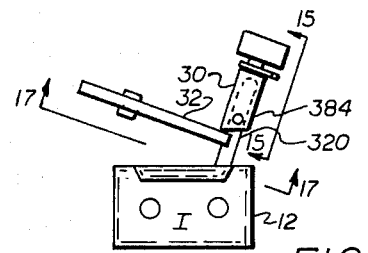
FIG. 16 is a plan view of station I of the loading apparatus of FIG. 1 and shows the second step in extracting the leader tape of a cassette.
Figure 17:
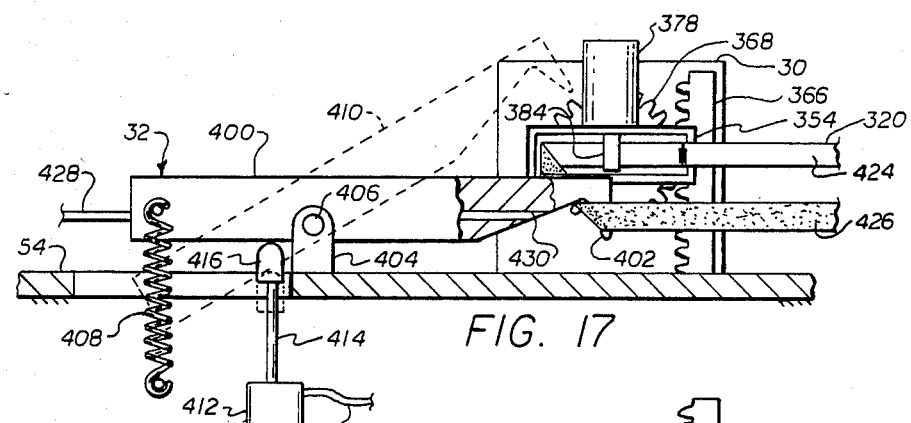
FIG. 17 is a side view of the leader extraction chamber of FIG. 15 and a loop separator. The leader pullout chamber is shown in an upright orientation.

In the third processing step, which is shown in FIGS. 16 and 17, the leader extraction chamber 30 pulls the leader tape 320 from the cassette 12 as it retracts. The loop separator 32 includes a finger 400 with a hook 402 formed in one end for positioning a portion of the leader tape 320 for later orientation on the lower half of the splice block 24. Finger 400 is pivotably attached to a stationary block 404 by a pivot pin 406. A tension spring 408, coupled to the end of finger 400 opposite hook 402, biases the finger upward to position 410. During the third step, a fixed air cylinder 412 extends a rod 414 and attached pad 416 to pivot the finger downward. Tubing 418 and 420 supply compressed air to the ports of cylinder 412 as required. Also during this step, the pin 384 is lowered into the chamber for retention of the leader tape.

Figure 18:
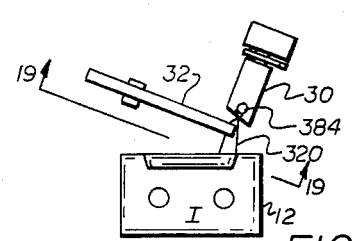
FIG. 18 is a plan view of station I of the loading apparatus of FIG. 1 and shows the process of twisting the leader tape of a cassette.
Figure 19:
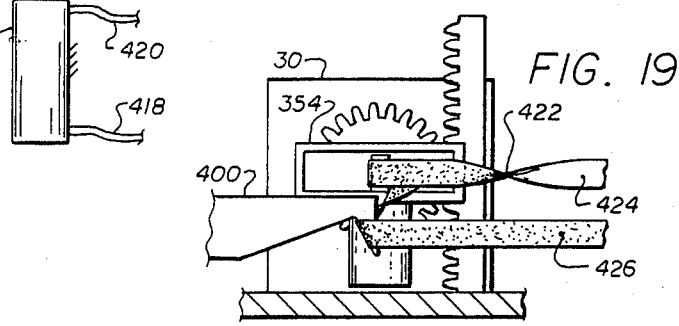
FIG. 19 is a side view of the leader extraction chamber of FIG. 15 and shows the chamber in an inverted orientation.

During the fourth processing step at station I, which is shown in FIGS. 18 and 19, the leader extraction chamber 30 rotates one half of a revolution to impart a twist 422 to the leader tape 320. This twist is necessary to orient the leader tape on the upper half of the splice block so as to allow both splices to be applied to the inner surface 424 of the tape, not the outer surface 426. The leader tape is now positioned for proper orientation on the splice block when the turntable 20 moves the cassette 12 to station II.

F. Station II

Figure 20:
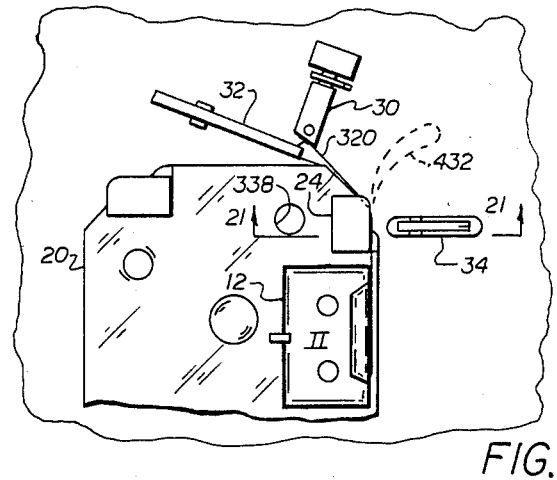
FIG. 20 is a plan view of stations I and II of the loading apparatus of FIG. 1 and shows the process of positioning the leader tape onto a splice block.

As cassette 12 is moved from station I to station II by turntable 20, the leader tape 320 is positioned on splice block 24. The loop extraction chamber 30 and the loop separator 32 remain in the positions assumed during the fourth step of station I, as shown in FIG. 20, with the leader tape twisted. As the the cassette moves from station I to station II, an additional amount of leader tape is withdrawn from the cassette since chamber 30 and separator 32 retain their grasp of the leader. Splice block 22 follows the cassette toward station II and contacts the leader tape just before it comes to rest at station II (now denoted as splice block 24). As the splice block contacts the leader tape, tape guides 270 and 272, and 278 and 280 respectively guide the upper portion of the leader tape to the upper part of the splice block and to the shuttle block 276. Tape guides 272 and 274 guide the lower portion of the leader tape to the lower part of the splice block. Twist 422 is positioned between the splice block and the cassette, thus the outer surface 426 of the leader tape is oriented toward the splice block in both cases. As the splice block reaches station II, vacuum is applied to ports 282, 284, and 286 as descriped earlier (see FIGS. 8 and 9). Leader tape 320 is thus positioned for subsequent cutting and splicing operations.

After the cassette 12 is indexed to station II, the loop extraction chamber 30 and the loop separator 32 are reset. To accomplish this, pin 384 is raised, finger 400 is raised, air is blow through tubing 428 and port 430 of the finger, and air is blow through hose 374 and vacuum chamber 354 to expell the leader tape 320. This combination of actions moves the leader tape to position 432. Also, the loop extraction chamber rotates back to its upright position. Station I is now ready to receive the next cassette.

Figure 21:
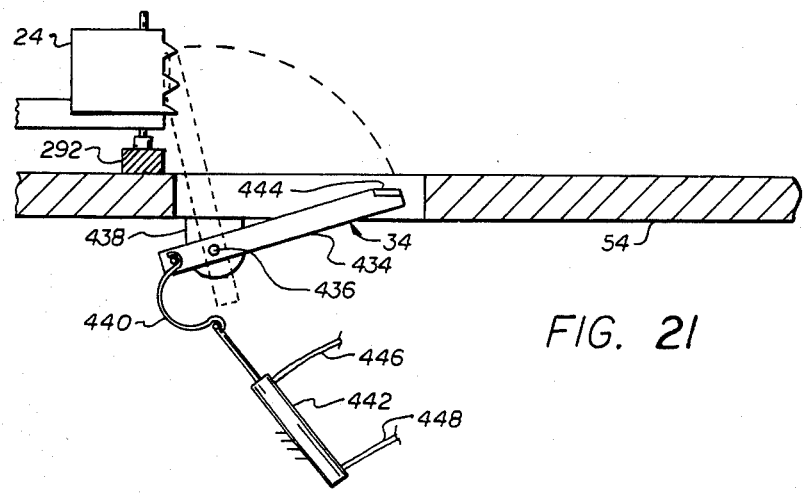
FIG. 21 is a side view of a tape cutter utilized a stations II and III of the loading apparatus of FIG. 1.

At station II, the leader tape 320 is cut into two pieces having first and second ends 324 and 326 (FIG. 12). Cutter 34 at station II includes an arm 434 pivotably mounted by a pin 436 to a fixed block 438, as shown in FIG. 21. A spring loop 440 flexibly connects the lower portion of the arm to a fixed air cylinder 442. A cutting edge 444 is affixed to the upper portion of the arm and may be, for example, removably affixed to permit periodic replacement. In operation, compressed air is supplied to the rod end port of cylinder 442 through tubing 446. The cylinder rod retracts, urging the arm to pivot upward and the cutting edge to strike the cutting pad 290 of the splice block 24, cutting the leader tape. To reset cutter 34, compressed air from tubing 448 extends the rod and lowers the arm.

G. Station III

At station III, the magnetic tape 36 is spliced onto the leader tape and a predetermined length of magnetic tape is wound onto one reel of cassette 12. As the turntable 20 indexes, the shuttle block 276 moves to its lower position. This provides room for the tape supply arm 328 to position the magnetic tape 36 for splicing to the first end 324 of the leader tape. A piece 330 of splice tape is applied to the magnetic tape and the leader tape by the station III tape splicer mechanism 40.

Figure 22:
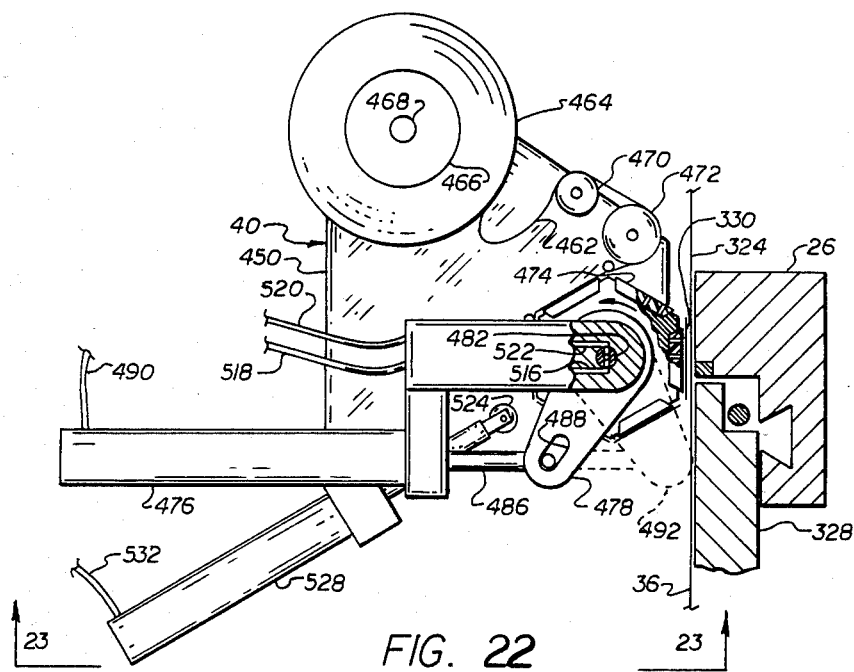
FIG. 22 is a plan view of a tape splicer mechanism utilized at stations III and IV of the loading apparatus of FIG. 1.
Figure 23:
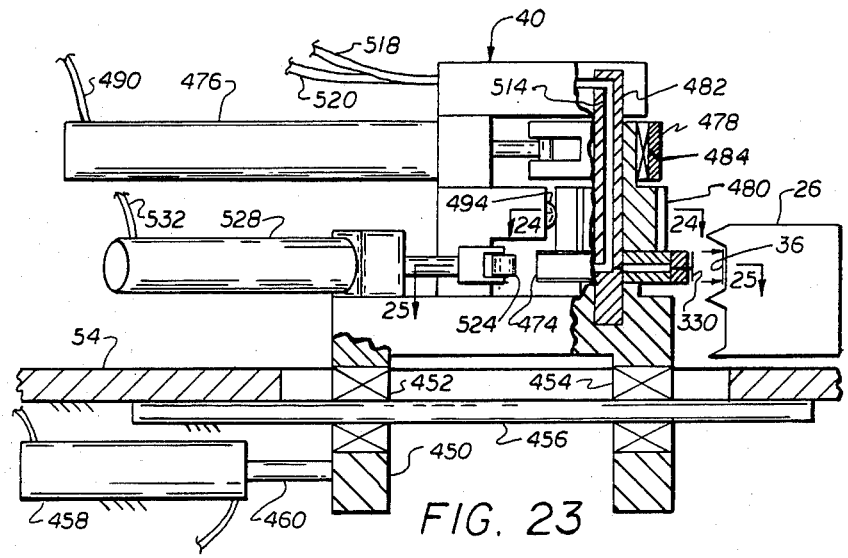
FIG. 23 is a side view partially in section of the tape splicer mechanism of FIG. 22.

The construction details of tape splicer mechanism 40 is shown in FIGS. 22 and 23. A carriage 450 is disposed for horizontal translation toward and away from splice block 26. Carriage 450 has two linear bearings 452 and 454 that guide it along a fixed rod 456. A fixed air cylinder 458, coupled to the carriage by cylinder rod 460 provides means for moving the carriage.

The tape splicer mechanism 40 positions a short length of splicing tape 462 to splice the magnetic and leader tapes held by splice block 26. A supply reel 464 of splicing tape is carried by a hub 466 which is pivotably mounted to the carriage by a pin 468. Splicing tape is routed around two rollers 470 and 472 and onto a six sided star wheel 474. Rollers 470 and 472 are preferably composed of a non-stick material such as acetal to prevent the splicing tape from sticking.

The star wheel 474 positions the piece of splicing tape 330 to be applied to the magnetic and leader tapes. Vacuum is applied internally to the star wheel to hold the splicing tape with the sticky side outward. After a splice is applied, the star wheel advances sixty degrees in preparation for the next splice.

Figure 24:
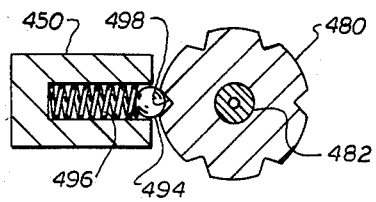
FIG. 24 is a sectional view of a detent mechanism used on the tape splicer mechanism of FIG. 22.

The mechanism that advances the star wheel includes an air cylinder 476, an arm 478, and a detent hub 480. Detent hub 480 is disposed for rotation about a vertical axis defined by a stationary shaft 482. The star wheel 474 is affixed to the lower portion of the detent hub and rotates with the hub. One end of the arm is coupled to the upper portion of the detent hub by a roller clutch 484. Rod 486 of cylinder 476 is coupled to a slot 488 at the other end of the arm. To advance the star wheel, compressed air is supplied to the piston side of cylinder 476 through tubing 490. This advances the arm to position 492 and rotates the detent hub and attached star wheel by sixty degrees. The detent hub is retained in this position by a ball 494 biased by a coil spring 496 against one of six equally spaced notches 498 in the hub; see FIG. 24. To reset the advance mechanism, the cylinder is vented, allowing an internal spring to retract the rod 486. The detent hub remains stationary during the reset motion since the roller clutch permits the arm to freely rotate in the clockwise direction.

Figure 25:
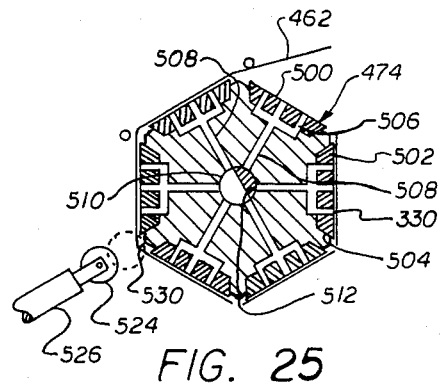
FIG. 25 is a sectional view of a star wheel used of the tape splicer mechanism of FIG. 22 and shows a network of vacuum passages employed to grasp splice tape.

Vacuum is distributed to five of the six faces of star wheel 474. No vacuum is required on the face 500 that has transferred its piece of splice tape 330 to the magnetic and leader tape. A reduced amount of vacuum is required on face 502 to facilitate the transfer of the splice tape. Each face of the star wheel has a resiliant block 504 with several port holes 506 connecting to a radial passage 508; see FIG. 25. The stationary shaft 482 has a chamber 510 to supply vacuum to four of the faces and a restricted port 512 to supply a limited amount of vacuum to face 502. The radial passage to face 500 is blocked by shaft 482. The stationary shaft opens and closes vacuum access to the faces as the star wheel rotates. Vacuum enters an axial passage 514 in the shaft through a passage 516 in the carriage 450 from a vacuum supply tube 518. The magnitude of the vacuum in the shaft is sensed through tubing 520 and passage 522. When the vacuum is sensed to be too low, the splicing tape is probably not properly positioned on the star wheel. In that situation, an indicator light on the control panel 56 so informs the operator. After each rotation of the star wheel 474, the splicing tape 462 is cut to length to form the piece 330 that will be used for splicing. To accomplish this, a roller 524 is advanced by rod 526 of an air cylinder 528 to cut the tape against a corner 530 of the star wheel. Cylinder 528, which is attached to the carriage 450, has an internal spring to reset the rod and roller when air pressure is relieved in tubing 532.

Figure 26:
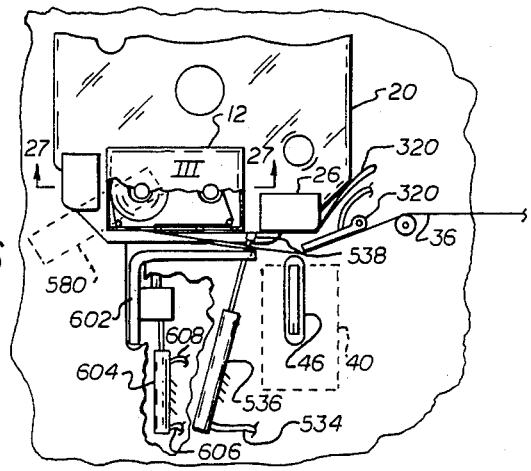
FIG. 26 is a plan view of station III of the loading apparatus of FIG. 1 showing the preparation for tape winding.

After splicing, the next operation at station III is to wind the magnetic tape 36 onto one reel of the cassette 12. In preparation for the winding operation, the lower portion of the leader tape 320 is clamped to the turntable 20 to prevent it from interferring with winding. To accomplish this, compressed air in tubing 534 causes the rod of a fixed air cylinder 536 to extend. A pad 538 on the end of the cylinder rod secures the leader tape to the turntable, as shown in FIG. 26. Also in preparation for tape winding, the tape supply arm 328 pivots and pulls the spliced tape from the splice block 26.

Figure 27:
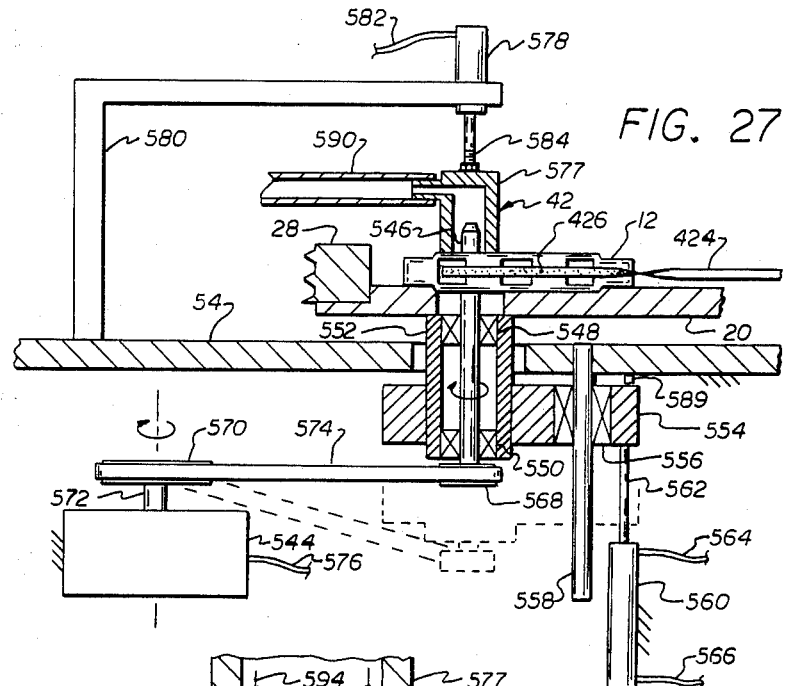
FIG. 27 is a sectional view of a tape winding mechanism utilized at station III of the loading apparatus of FIG. 1.
Figure 28:
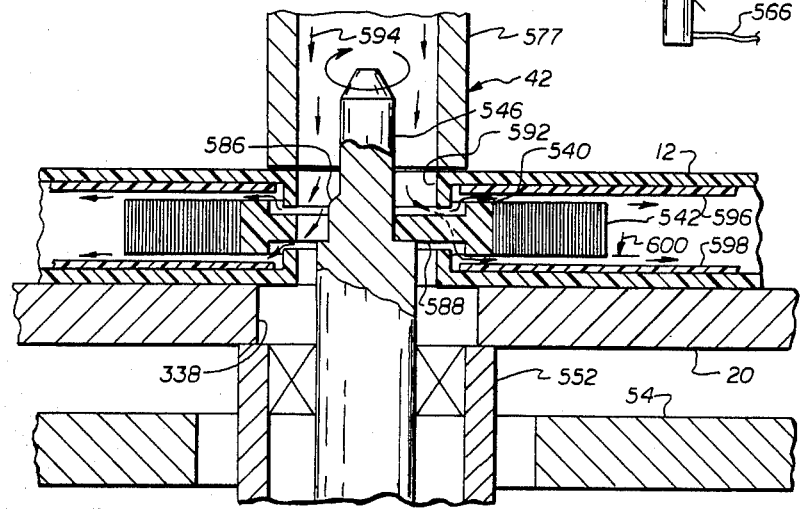
FIG. 28 is a sectional view of a cassette during the process of tape winding at station III.

Turning now to FIGS. 27 and 28, the tape winding mechanism and its operation will be described in detail. The tape winding mechanism consists of means for turning a reel 540 of the cassette 12 and means for blowing air through the cassette while winding to suspend the reel of tape 542 to reduce friction. Means for winding the tape include a motor 544, a belt driven spindle 546, and a raise and lower mechanism. Spindle 546 rotates about a vertical axis as defined by two rotary bearings 548 and 550. The bearings are disposed at the upper and lower ends of a bearing housing 552 which is affixed to a vertically movably carriage 554. To provide vertical guidance, the carriage includes a linear bearing 556 which guides the carriage along a fixed rod 558. A fixed air cylinder 560, coupled to the carriage by a rod 562, moves the carriage and the spindle vertically in response to air pressure in tubing 564 and 566. A pulley 568 affixed to the lower portion of the spindle and another pulley 570 affixed to the shaft 572 of motor 544 are connected by a belt 574 to permit the motor to rotate the spindle. The speed of the motor is regulated through a control line 576 in a method that will be explained in conjunction with the tape transport system.

Blowing air through the cassette 12 while winding is one of the unique features of the present invention. Means for accomplishing this include a blower head 577 that is positioned over the top of the cassette during the winding operation by an air cylinder 578. Cylinder 578 is positioned vertically above the cassette by a support arm 580. Compressed air in tubing 582 acts to lower the blower head, while a spring within cylinder 578 raises it. The blower head is threadedly attached to the end of the rod 584 of cylinder 578 to permit precise adjustment of the height of the air head. It is desirable to have a slight gap between the top of the cassette and the underside of the blower head so as not to compress the cassette when the air head is in position. It is also desireable to minimize the gap to prevent an excessive amount of air from escaping.

Once the spindle 546 has been raised and the blower head 42 lowered into their respective positions, the tape winding operation is ready to begin. One problem that may occur during the raising of the spindle is that a drive spline 586 on the spindle may interfer with a spline 588 on the reel 540. If this in fact happens, a sensor 589 will indicate that the spindle is not up to the proper height. in that case, the spindle is lowered, rotated, then raised once again.

When the tape winding operation begins, air is blown through the cassette 12 and through the tape supply arm 328, thus providing air bearing support for the magnetic tape 36. Air is supplied to the blower head 577 through a tubing 590. Air flows from the blower head and into the cassette through an opening 592 in the top of the cassette, as shown by arrows 594. Once in the cassette, the air flows radially past the reel 540 and between the reel of tape 542 and the upper and lower fly sheets 596 and 598. The fly sheets are composed of a low friction material to facilitate the rotation of the reel of tape.

The air flowing between the reel of tape and the fly sheets creates a gap 600 that acts as an air bearing. Since the reel of tape is riding on an air bearing instead of riding on the lower fly sheet, the winding speed can be increased significantly without buring the tape. Higher winding speeds lead to shorter processing times and high productivity. Once an appropriate amount of magnetic tape 36 has been wound onto the cassette reel 540, motor 544 stops spindle 546. Vacuum is turned on to the tape supply arm 328, which pivots back to the splice block 26. Next, the blower head 577 is raised, the spindle 546 is lowered, and cylinder 536 releases the leader tape 320.

Figure 29:
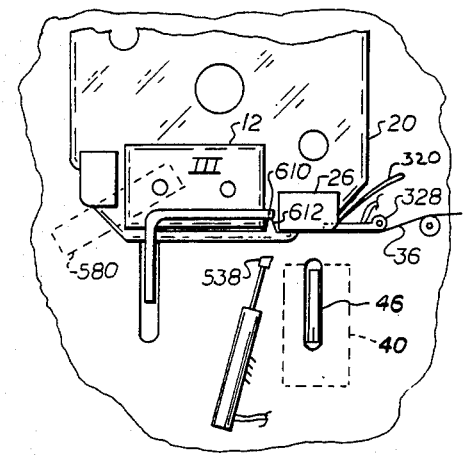
FIG. 29 is a plan view of station III of the loading apparatus of FIG. 1 showing the preparation for turntable indexing.
Figure 30:
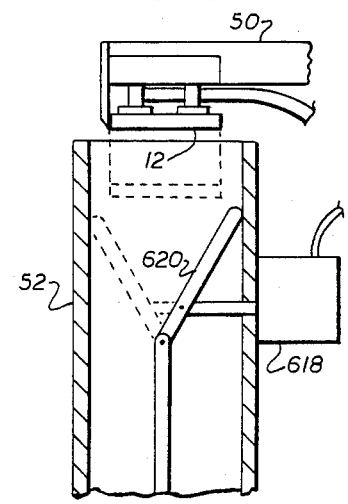
FIG. 30 is a sectional view of a sorting mechanism utilized with the loading apparatus of FIG. 1.

The reel of tape 542 now wound in the cassette has significant rotational inertia. When the cassette is later indexed to station IV, the inertia of the reel of tape will pull the end 332 of the magnetic tape from the splice block unless there is some slack. Accordingly, a loop former 602 at station III forms the slack in the tape, as shown in FIG. 29. An air cylinder 604, in response to air pressure in tubing 606 and 608, moves the loop former first toward then away from the turntable 20. A pin 610 disposed proximate the magnetic tape forms the necessary loop 612.

The final operation at station III is that of cutting the magnetic tape 36. Cutter 46 is identical in construction and operation to cutter 34 described above. An air cylinder 613 (not shown) retracts to pivot the cutter upward. The magnetic tape is cut against the cutting pad 290 of splice block 26. Station III operations are now complete and the cassette 12 is ready to move to station IV.

H. Station IV

At station IV, the trailing end 332 of the magnetic tape is spliced to the second end of the leader tape 326. The station IV tape splicer mechanism 48 is identical in construction and operation to the previously described station III splicer 40. Air cylinders 615, 617, and 619 (not shown) of the station IV splicer correspond to air cylinders 458, 476, and 528, respectively, of the station III splicer. After the splicing operation, the supply of vacuum is shut off to tube 252 to release the vacuum to the splice block 28. The loose tape is then wound onto the cassette reel 540 by a winding mechanism 623 identical in construction and operation to the previously described winding mechanism 336 of station I. Air cylinder 625 and motor 627 (not shown) of winding mechanism 623 correpond, respectively, to air cylinder 346 and motor 342 of winding mechanism 336. The presence of a cassette at station IV is sensed by a sensor 629 (FIG. 13) located under the turntable 20. The cassette is now loaded with magnetic tape and is ready to be unloaded from the turntable.

I. Cassette Unloader

If the station IV sensor 629 indicates the presence of a cassette 12 at station IV, the unloading mechanism 50 picks up the cassette and drops it in the sorting mechanism 52. While the unloading mechanism 50 is functionally equivalent to the previously described loading mechanism 18, there are a few differences. The unloader 50 travels further from the turntable 20 to the sorter 52 than the loader 18 travels from the conveyor 16 to the turntable. Accordingly, the unloader has a cylinder 614 and rack 616 that provide the necessary travel; (shown in FIG. 1). The other main difference between the two is that the sequence of operations is reversed. Air cylinder 631 and vacuum tubing 633 of the unloader correspond, respectively, to air cylinder 148 and vacuum tubing 176 of the loader.

The sorting mechanism 52 acts as a quality control device to reject problem cassettes. Problems such as improper splices can be detected by monitoring the vacuum pressure at the splice blocks. These and other problems are detected by the apparatus control system and direct a solenoid 618 to shift a gate 620 accordingly.

A cassette 12 that is unloaded from the turntable 20 by the unloading mechanism 50 is directed to the reject bin if the gate is so positioned.

J. Tape Transport System

The tape transport system supplies a predetermined amount of blank or pre-recorded magnetic tape 36 for loading into the cassette 12. In addition, winding speed is adjusted to control tape tension. The tape transport system includes the tape transport mechanism 44, shown in FIGS. 31, 32, and 33, and also includes a tape transport control system, shown in FIG. 34, that interfaces to the elements of mechanism 44.

Figure 31:
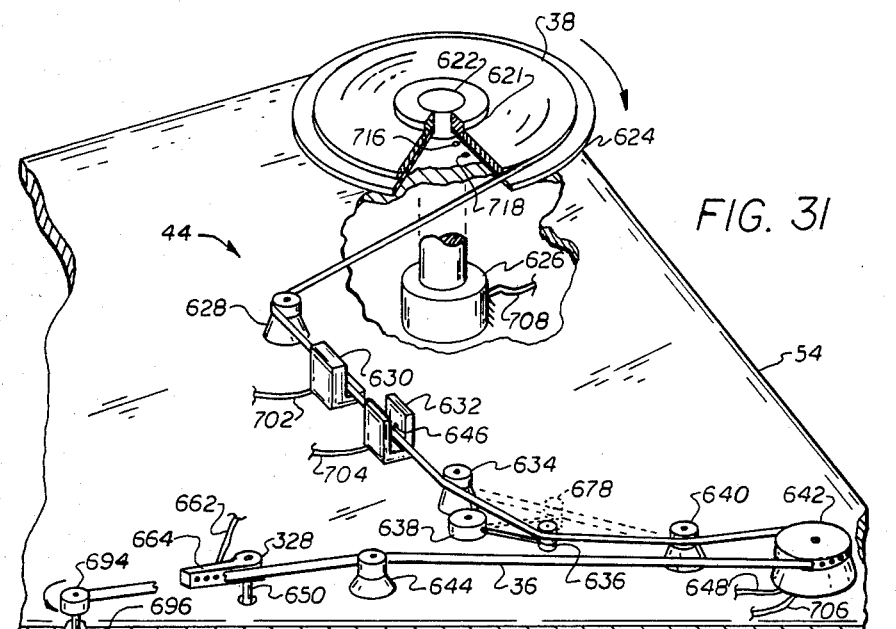
FIG. 31 is a perspective view of a tape transport mechanism utilized with the loading apparatus of FIG. 1.

First, the elements of the tape transport mechanism will be described in reference to FIG. 31. The magnetic tape 36 to be loaded into the cassette is contained on the supply reel 38. Several cassettes may be loaded with tape from a single supply reel. The hub 621 of the supply reel mounts to a centering hub 622 and rests upon a platter 624. Positioned below and coupled to the centering hub is a tape supply motor 626. Tape from the supply reel is routed around a first pulley 628, a cueing sensor 630, an end-of-tape sensor 632, a second pulley 634, a roller 636 of a tension sensor 638, a third pulley 640, a tachometer 642, and a fourth pulley 644 to the tape supply arm 328. Each of the four pulleys is disposed for rotation about their respective vertical axes. The end-of-tape sensor detects the presense of the tape using a photodetector 646. It is used in identifying cassettes that may be loaded with less then the desired length of tape. The tachometer preferably uses vacuum from tubing 648 to reduce slipage of the tape on its hub to yield accurate tape speed and length measurements.

The function of the tape supply arm 328, described previously, is to position the magnetic tape 36 with respect to the station III splice block 26. To accomplish this, the tape supply arm is attached to a shaft 650 that is pivotably attached to the deck plate. One end of an arm 652 is attached to the lower portion of the shaft and the other end is coupled to the rod 654 of a fixed air cylinder 656. Compressed air supplied to the cylinder through tubing 658 and 660 causes the cylinder to pivot the tape supply arm. At various times either vacuum or compressed air is supplied from tubing 662 to several ports 664 on the face of the tape supply arm.

Figure 33:
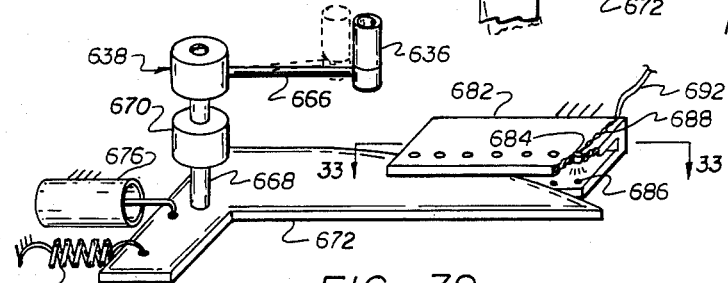
FIG. 33 is a plan view partially in section of the tension sensor of FIG. 32.
Figure 32:
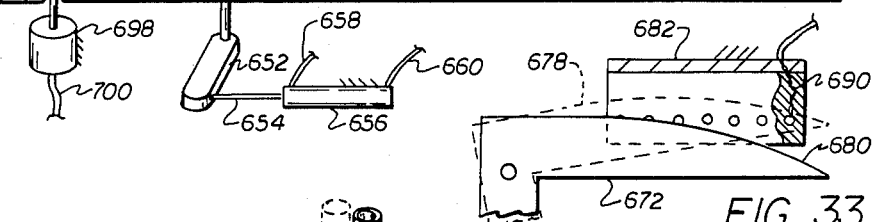
FIG. 32 is a perspective view of a tension sensor incorporated in the tape transport mechanism of FIG. 31.

The tension sensor 638 is shown in greater detail in FIGS. 32 and 33. An arm 666 connecting the roller 636 to the tension sensor pivots shaft 668 according to the tension in the tape. Shaft 668 is supported and allowed to rotate about a vertical axis by a rotary bearing 670. A horizontal blade 672 is disposed at the lower end of shaft 668. A coil spring 674 is attached to the blade for reacting the tension force of the tape. A dashpot 676 is also attached to the blade for damping sensor oscillations. Sensor 638 rotates counterclockwise to position 678 against the restoring force of spring 674 when the tension in tape 36 increases.

A curved portion 680 of blade 672 is utilized to determine the angular position of the tension sensor and the corresponding tape tension. A photodetector array 682 senses the position of the curved portion of the blade. Each photodetector in the array includes a light source 684 and a light detector 686. Wires 688 and 690 from each source and detector are connected to the tape transport control system via cable 692. The angular position of the tension sensor is determined by the number of photodetectors blocked by the curved blade.

Also included in the tape transport mechanism 44 is a take-up reel 694 that is utilized with pre-recorded tape. The take-up reel is disposed at the upper end of a shaft 696 of a fixedly mounted motor 698. The take-up motor 698 winds tape 36 onto the reel upon commands received through cable 700 from the tape transport control system. Other elements of the tape transport mechanism, such as cueing sensor 630, end-of-tape sensor 632, tachometer 642, and tape supply motor 626, are also connected to the control system via cables 702, 704, 706, and 708, respectively.

Figure 34:
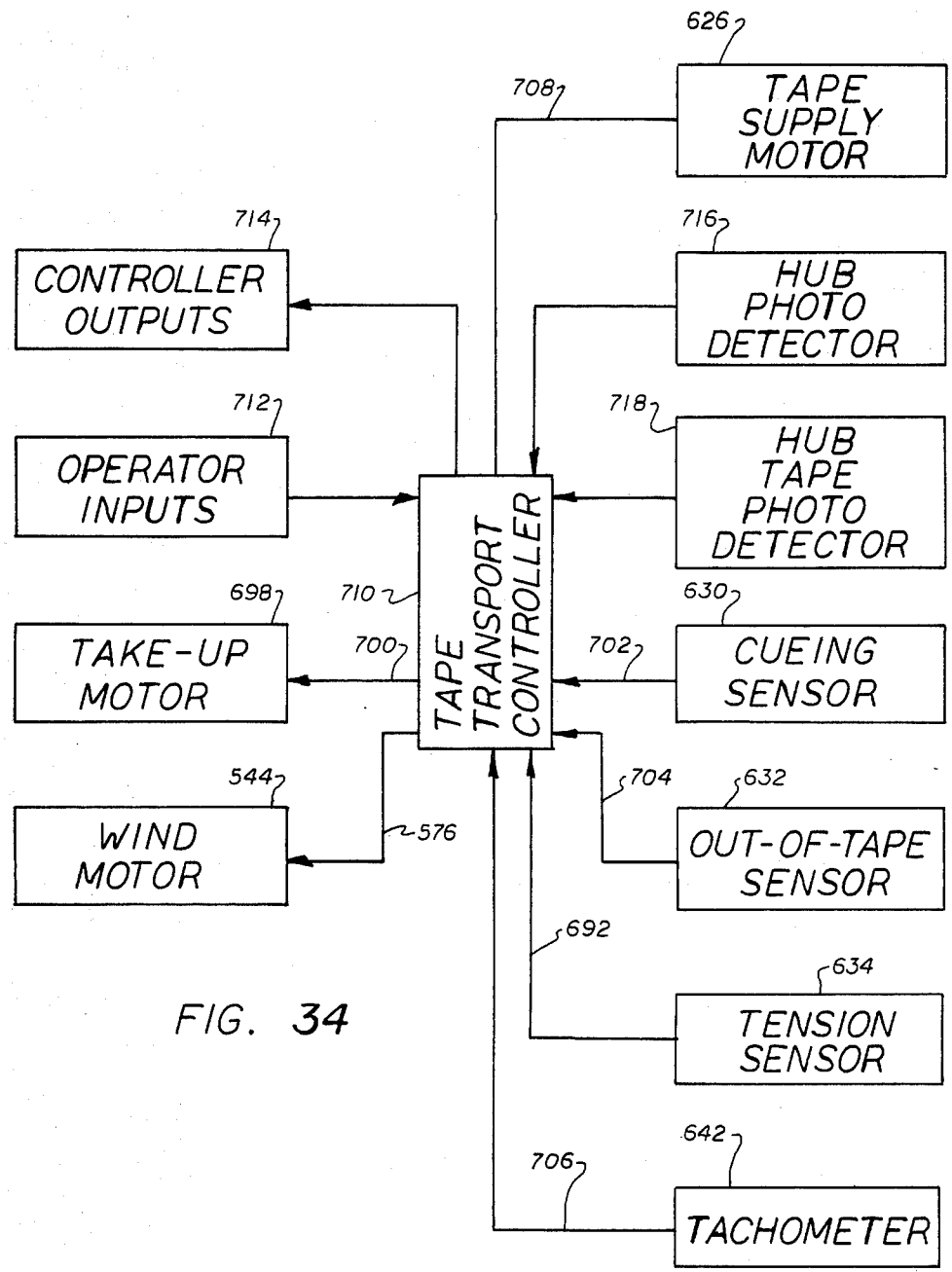
FIG. 34 is a functional block diagram of a system for controlling the operation of the tape transport mechanism of FIG. 31.
Figure 35:
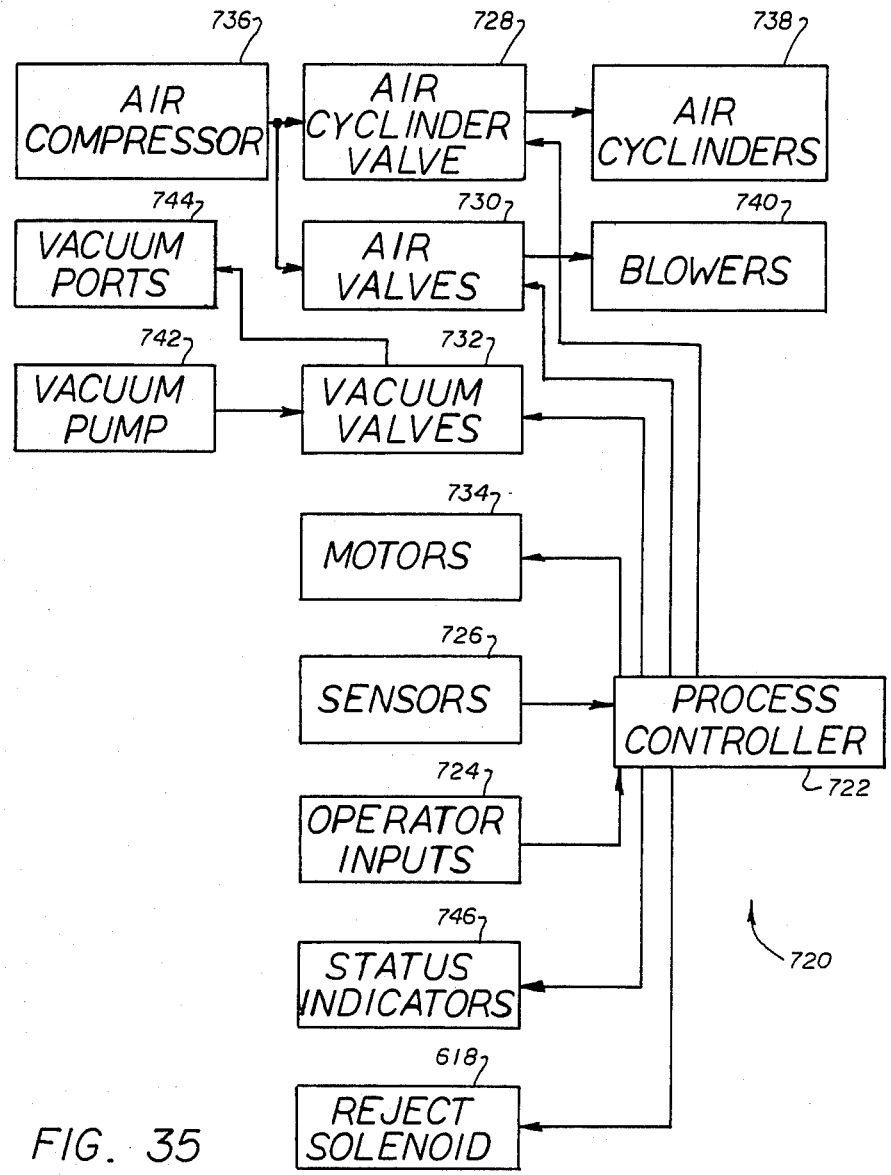
FIG. 35 is a functional block diagram of a system for controlling the operation of the loading apparatus of FIG. 1.

In reference now to FIG. 34, the tape transport control system will now be described. The sensors and motors described above form part of the tape control system. A tape transport controller 710 acts to control the interrelationships among those sensors and motors. Operator inputs 712 supply information such as whether blank or pre-recorded tape is being loaded and the desired tape footage. Controller outputs 714 inform the operator of the status of the tape control system. Two additional sensors, a hub photodetector 716 and a hub tape photodetector 718 are positioned under the platter 624. They respectively sense the presence of the supply reel hub 621 and the presense of more than a minimal amount of tape on the supply reel 38.

During the loading of blank magnetic tape into a cassette 12, the tape transport controller 710 continuously monitors tape velocity and tape length. Both tape velocity and tape length are sensed by the tachometer 642. The tape controller 710 adjusts the speed of the tape supply motor 626 to maintain a constant tape velocity. Tape length is used to determine when to stop the supply of tape. The tape controller also monitors tape tension which is indicated by the tension sensor 638. The speed of the wind motor 544 is adjusted to maintain a constant tape tension during cassette loading.

When a supply reel 38 of pre-recorded magnetic tape is first used, the tape is threaded through the tape transport mechanism 44 as with blank tape, placing the end on the take-up reel 694. The tape controller 710 directs the take-up motor 698 to wind the tape until the cueing sensor detects the first cueing signal on the tape. Cutter 46 then cuts the tape at that point. During the loading of a cassette with pre-recorded tape, the tape controller directs the wind motor 544 to wind tape until another cueing signal is detected by the cueing sensor. In this fashion, portions of pre-recorded tape bounded by cueing signals are loaded into the cassettes.

K. Process control system

The process control system 720 provides sequential control for the many elements of the tape loading apparatus 10. A process controller 722 accepts operator inputs 724 to initiate and terminate the loading process. Inputs from various sensors 726 define the status of the elements of apparatus 10. These sensors include vacuum sensors for the tape splicing mechanisms 46 and 48 and the splice blocks, as well as the station III spindle position sensor and the station IV cassette presense sensor.

With this information and with the predetermined sequence of operation, the process controller controls air cylinder valves 728, air valves 730, vacuum valves 732 and motors 734. Depending on the state of the air cylinder valves, an air compressor 736 supplies compressed air to the several air cylinders 738 within the apparatus. The air compressor also suplies air to several blowers 740 including the air blower 42. Similarly, a vacuum pump 742 supplies vacuum to several vacuum ports 744 according to the state of the vacuum valves. The process controller also informs the operator of the status of the process and of any problems that arise through status indicators 746. The reject solenoid 618 of the sorting mechanism 52 rejects those cassettes that the process controller finds to violate certain quality considerations described earlier.

L. Summary of Operation

Figures 36A, 36B:
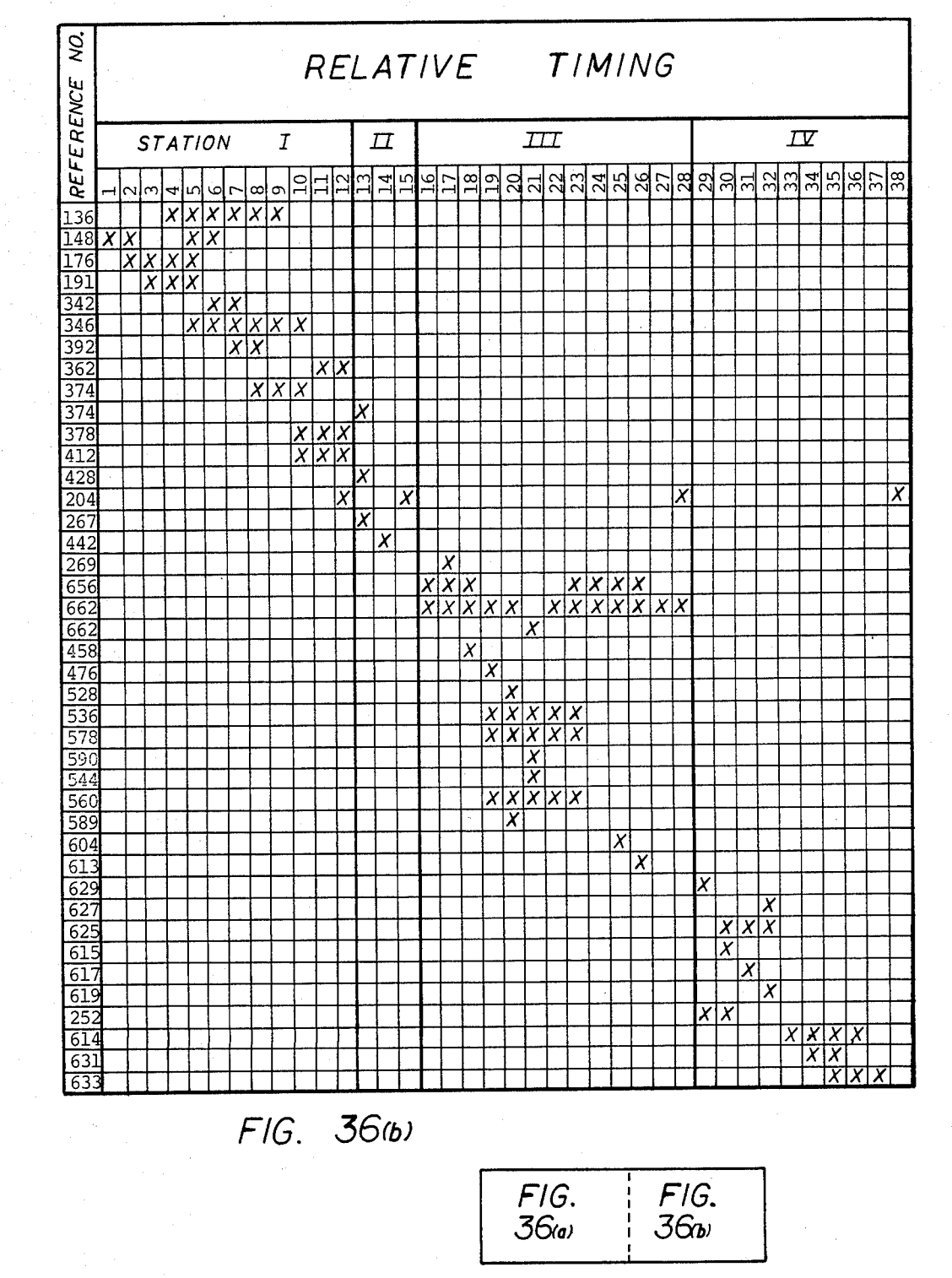

FIG. 36 shows the sequential processing steps that occur as tape is loaded into a single cassette 12. The processing steps that occur at each station are indicated. Although the processing steps at each station are repeated for other following cassettes, only those steps impacting a single cassette are listed. Components are listed as acting directly or indirectly on the cassette. The hopper 14 and the tape transport system are not included in FIG. 36. The reference numbers listed in FIG. 36 refer to the device that cause the action listed.

The following steps summarize the actions under the direct control of the process control system 720 that are involved in the sequential processing of one cassette 12:

Step 1: Cylinder 148 lowers arm 146 to conveyor 16

Step 2: Tube 176 supplies vacuum to suction cups 168, 170, and 172. Suction cups grasp cassette 12.

Step 3: Cylinder 148 raises arm 146 and cassette 12. Vacuum sensor 191 senses cassette 12.

Step 4: Cylinder 136 rotates loader 18 to turntable 20.

Step 5: Cylinder 148 lowers arm 146, placing cassette 12 onto turntable 20. Cylinder 346 raises spindle 344.

Step 6: Tube 176 releases vacuum to suction cups. Motor 342 winds leader tape 320 onto reel 540.

Step 7: Cylinder 148 raises arm 146. Cylinder 392 extends tape extraction chamber 30 to cassette 12.

Step 8: Motor 342 stops. Hose 374 applies vacuum to chamber 354, extracting leader tape 320.

Step 9: Cylinder 392 retracts tape extraction chamber 30.

Step 10: Cylinder 136 rotates loader 18 to conveyor 16. Cylinder 378 extends pin 384 into chamber 354. Cylinder 412 lowers finger 400.

Step 11: Cylinder 346 lowers spindle 344. Cylinder 362 flips tape extraction chamber 30. Hose 374 releases vacuum.

Step 12: Cylinders 204 and 208 advance turntable 20. Cassette 12 moves to station II.

Step 13: Cylinder 378 retracts pin 384. Cylinder 412 raises finger 400. Hose 374 supplies compressed air to blow leader tape 320 from chamber 354. Tubing 428 supplies compressed air to blow leader tape 320 away from loop separator 32. Cylinder 362 uprights tape extraction chamber 30. Vacuum sensor 267 detects presence of leader tape on splice block 24.

Step 14: Cylinder 442 pivots cutter 34, cutting leader tape 320.

Step 15: Cylinder 204 and 208 advance turntable 20. Cassette 12 moves to station III.

Step 16: Tubing 662 supplies vacuum to tape supply arm 328. Cylinder 656 pivots tape supply arm 328 to splice block 26.

Step 17: Vacuum sensor 269 detects presence of leader tape 320 and magnetic tape 36 on splice block 26.

Step 18: Cylinder 458 advances splicer 40, splice tape 330 splices leader tape 320 and magnetic tape 36.

Step 19: Cylinder 458 retracts splicer 40. Cylinder 656 pivots tape supply arm 328 away from splice block 26. Cylinder 476 advances star wheel 474. Cylinder 536 clamps leader tape 320. Cylinder 578 lowers air blower 42. Cylinder 560 raises spindle 546.

Step 20: Cylinder 528 cuts splice tape 462. Sensor 589 detects height of spindle 546.

Step 21: Tubing 662 supplies compressed air to tape supply arm 328. Tubing 590 supplies air to air blower 42. Motor 544 rotates spindle 546, winding tape onto reel 540.

Step 22: Motor 544 stops. Tubing 662 supplies vacuum to tape supply arm 328. Air flow from tubing 590 stops.

Step 23: Cylinder 656 pivots tape supply arm to splice block 26.

Step 24: Cylinder 536 releases leader tape 320. Cylinder 578 raises air blower 42. Cylinder 560 lowers spindle 546.

Step 25: Cylinder 604 forms loop 610 in magnetic tape 36.

Step 26: Cylinder 613 pivots cutter 46, cutting magnetic tape 36.

Step 27: Cylinder 656 pivots tape supply arm 328 away from splice block 26.

Step 28: Cylinders 204 and 208 advance turntable 20. Cassette 12 moves to station IV.

Step 29: Sensor 629 detects presence of cassette 12. Tubing 252 supplies vacuum to splice block 28.

Step 30: Cylinder 625 raises winding mechanism 623. Cylinder 615 advances splicer 48, transferring splice 334 to magnetic tape 332 and leader tape 326.

Step 31: Cylinder 615 retracts splicer 48. Cylinder 617 advances star wheel. Tubing 252 releases vacuum to splice block 28.

Step 32: Motor 627 winds slack tape onto reel 540. Cylinder 619 cuts splicing tape.

Step 33: Motor 627 stops. Cylinder 625 lowers winding mechanism 623. Cylinder 614 pivots unloader 50 to turntable 20.

Step 34: Cylinder 631 lowers unloader suction head to cassette 12.

Step 35: Tubing 633 supplies vacuum to unloader suction head, grasping cassette 12.

Step 36: Cylinder 631 raises unloader suction head and cassette 12 from turntable 20.

Step 37: Cylinder 614 pivots unloader to sorter 52.

Step 38: Tubing 633 releases vacuum, dropping cassette 12. Cylinders 204 and 208 advance turntable 20.

Although a single preferred embodiment of the present invention has been disclosed above, it is contemplated that numerous alterations and modifications may become apparent to those skilled in the art after having read the above disclosure. Accordingly, it is intended that the appended claims be interpreted as covering all such alterations and modifications as fall within the true spirit and scope of the invention.

We claim:

1. Cassette loading apparatus for winding tape into cassettes having a tape leader connected between at least two spools comprising:
   tape supply means for providing recording tape;
   transport means receiving a plurality of cassettes for carrying each cassette sequentially in a stream by a plurality of work stations;

extraction means for extracting a loop of the tape leader from each cassette received at a first work station;

holder means carried by said transport means for receiving, aligning and holding a length of the tape leader forming the loop;

first cutter means disposed at a second work station for cutting the length of the tape leader creating first and second leader segments each with a cut end and each connecting with one of the spools of the cassette;

splicing means disposed at a third work station for splicing an end of the recording tape to the cut end of said first leader segment attached to a first spool of said cassette;

winding means disposed at said third work station for engaging and rotating the first spool of the cassette and winding a desired length of the recording tape about such spool;

second cutter means disposed at said third work station for cutting said recording tape creating a first cut end thereof thereof terminating the recording tape wound about the first spool of the cassette and a second cut end terminating the recording tape from the supply means;

splicing means disposed at a fourth work station for splicing the cut end of said second leader segment to the first cut end of the recording tape, whereby at least four cassettes are being operated on simultaneously.

2. Cassette loading apparatus as recited in claim 1, wherein said transport means includes:

a rotatable platform disposed to rotate about an axis, said platform receiving and holding each cassette in a position such that the axes of its spools are parallel to the platform axis and the record/playback side of said cassette faces outwardly relative to said platform.

3. Cassette loading apparatus as recited in claim 2, wherein said holder means includes a vacuum block affixed to said platform and disposed adjacent said cassette, said block including tape/leader receiving slot means having vacuum openings therein.

4. Cassette loading apparatus as recited in claim 3, wherein said holder means further includes a shuttle means having first slot for receiving and holding the second leader segment, said shuttle means being movable between a leader cutting and splicing position and a clearance position.

5. Cassette loading apparatus as recited in claim 4 wherein said holder means further includes a second slot and a third slot positioned therebeneath, and wherein said first slot is aligned with said second slot when said shuttle means is in said cutting and splicing position.

6. Cassette loading apparatus as recited in claim 5, and further comprising:

cam means disposed proximate said platform, and wherein said shuttle means includes a cam follower for engaging said cam means and causing said shuttle means to move into said clearance position at said third work station.

7. Cassette loading apparatus as recited in claim 6, wherein the transport means further includes, first pickup means for positioning a cassette on said rotatable platform at the first work station.

8. Cassette loading apparatus as recited in claim 7 wherein said first pickup means includes a first pickup arm pivotal between a first pickup position and a first discharge position, said discharge position being in alignment with the position of said cassette on said platform at said first work station.

9. Cassette loading apparatus as recited in claim 8, wherein said first pickup means further includes actuator means for lifting the distal end of said first pickup arm from said first pickup position to a swing position, and for lowering said distal end from said swing position to said first discharge position.

10. Cassette loading apparatus as recited in claim 9, wherein said first pickup means inludes damping means for damping oscillations of said first pickup arm as it is rotated into said first discharge position.

11. Cassette loading apparatus as recited in claim 10, wherein said damping means includes means forming a chamber disposed at the distal end of said first pickup arm and means forming a damping mass disposed within said chamber and moveable between first and second positions therein.

12. Cassette loading apparatus as recited in claim 1 wherein the extraction means includes means for holding the loop as said transport means carries the associated cassette to said second work station, said extraction means being operative to cause said tape leader to be engaged by said holder means.

13. A cassette loading apparatus as recited in claim 12, wherein said extraction means includes a tape leader engaging head means movable from an engaging position to an extracting position, said head means having a vacuum opening facing said cassette for holding said tape leader in engagement therewith as it moved from said engaging position to said extracting position.

14. A cassette loading apparatus as recited in claim 13, and further including:

finger means for engaging a portion of the tape leader loop extracted from said cassette and for holding it in a predetermined position, and means rotating said head for twisting another portion of the extracted tape leader loop the other portion being received by said holder means, with its normally inside face facing outwardly as the transport means rotates the associated cassette to the second work station.

15. Cassette loading apparatus as recited in claim 14, wherein said holder means includes an anvil located behind the twisted portion of tape leader, and wherein said cutter means comprises a cutting edge moveable to engage the anvil for severing the twisted portion of tape leader, and means for moving the edge into engagement against the anvil.

16. Cassette loading apparatus as recited in claim 15, wherein said tape supply means includes a moveable guide arm for guiding said recording tape and for positioning the second cut end thereof in in aligned butting relationship with the cut end of said first leader segment at said third work station.

17. Cassette loading apparatus as recited in claim 16, wherein each splicing means includes:

means for carrying a supply of splicing tape, a multifaceted splicing wheel adapted to carry segments of said splicing tape on its several faces, said wheel being moveable between a retracted position and a splicing position wherein one of said faces carries a segment of said splicing tape into engagement with the aligned butted ends of said leader and said tape.

18. Cassette loading apparatus as recited in claim 17, wherein each splicing means further includes cutting means for cutting said splicing tape into said segments.

19. Cassette loading apparatus as recited in claim 18, wherein each splicing means includes means for sequentially indexing each of the faces of said splicing wheel into a splicing position.

20. Cassette loading apparatus as recited in claim 19, wherein said splicing wheel includes vacuum means for holding said splicing tape to said faces until it is transferred to a leader-to-tape junction.

21. Cassette loading apparatus as recited in claim 20, wherein said winding means includes:
a spindle for drivably engaging the first spool, and
means for blowing pressurized air into said cassette about said spindle to provide flows of air above and below said first spool for reducing frictional engagement between the recording tape being wound onto said first spool and slip sheets/cassette walls disposed above and below the spool.

22. Cassette winding apparatus as recited in claim 21, and further including:
a second pivotal pickup arm disposed to rotate between a second pickup position wherein it engages a cassette carried by said transport means at said fourth work station, and a release position.

23. Cassette loading apparatus as recited in claim 22, wherein the transport means includes:
conveyor means for transporting cassettes from a supply position to a position aligned with said first pickup position of said first pickup arm.

24. Cassette loading apparatus as recited in claim 23, wherein the transport means includes:
hopper means disposed proximate said cassette supply position and operative to discharge cassettes onto said conveyor means.

25. Cassette loading apparatus as recited in claim 24, wherein said hopper means includes
an elongated chute for containing a plurality of cassettes disposed with their record/playback faces facing in either a first direction or a second direction opposite said first direction,
metering means for selectively releasing one cassette at a time for discharge from said chute,
sensor means for sensing whether a cassette to be released from said chute is facing in said first direction or in said second direction, and
flipping means responsive to said detecting means and operative to flip those cassettes facing in said second direction so that upon discharge they face in said first direction.

26. Cassette loading apparatus as recited in claim 20, wherein said winding means includes:
a spindle for drivably engaging said first spool, and
means for blowing pressurized air into said cassette about said spindle to provide flows of air above and below said first spool for reducing frictional engagement between the tape being wound onto said first spool and slip sheets/cassette walls disposed above and below the winding.

27. Cassette loading apparatus as recited in claim 1 wherein said transport means includes:
first pickup means for positioning a cassette at the first work station.

28. Cassette loading apparatus as recited in claim 27, wherein said first pickup means includes a first pickup arm pivotal between a first pickup position and a first discharge position, said first discharge position being in alignment with the position of said cassette on said transport means at said first work station.

29. Cassette loading apparatus as recited in claim 28, wherein said first pickup means further includes actuator means for lifting the distal end of said first pickup arm from said first pickup position to a swing position, and for lowering said distal end from said swing position to said first discharge position.

30. Cassette loading apparatus as recited in claim 29, wherein said first pickup means includes damping means for damping oscillations of said first pickup arm as it is rotated into said first discharge position.

31. Cassette loading apparatus as recited in claim 30, wherein said damping means includes means forming a chamber disposed at the distal end of said first pickup arm and means forming a damping mass disposed within said chamber and moveable between first and second positions therein.

32. Cassette winding apparatus as recited in claim 31, and further comprising:
a second pivotal pickup arm disposed to rotate between a second pickup position wherein it engages a cassette carried by said transport means at said fourth work station, and a release position.

33. Cassette loading apparatus as recited in claim 32 wherein the transport means includes conveyer means for transporting cassettes from a supply position to a position aligned with said first pickup position of said first pickup arm.

34. Cassette loading apparatus as recited in claim 33 wherein the transport means further includes hopper means disposed proximate said cassette supply position and operative to discharge cassettes onto said conveyer means.

35. Cassette loading apparatus as recited in claim 34, wherein said hopper means includes:
an elongated chute for containing a plurality of cassettes disposed with their record/playback faces facing in either a first direction or a second direction opposite said first direction,
metering means for selectively releasing one cassette at a time for discharge from said chute,
sensor means for sensing whether a cassette to be released from said chute is facing in said first direction or in said second direction, and
flipping means responsive to said detecting means and operative to flip those cassettes facing in said second direction so that upon discharge they face in said first direction.

36. Cassette loading apparatus as recited in claim 30 and further comprising:
means disposed at said third work station for engaging and holding the second segment of tape leader attached to said second spool as said tape is wound upon said first spool.

37. Cassette loading apparatus as recited in claim 36, and further comprising:
means disposed at said third work station for providing a slack loop between the first spool of the cassette and the supply means in the recordng tape after the desired length is wound upon said first spool.

38. Cassette loading apparatus as recited in claims 1 or 30, and further comprising:
means disposed at said fourth work station for engaging said first spool to wind all available leader/tape onto said first spool.

39. Cassette loading apparatus as recited in claims 1 or 30, wherein said winding means includes a first drive motor, and wherein said supply means includes a tape supply spindle,
a second drive motor for driving said supply spindle,
tachometer means for driving said supply measuring the length and speed of the tape supplied by said spindle,
and tape tension monitoring means, and further comprising:
control means responsive to said tachometer means and said tension monitoring means and operative to differentially control the rotational speeds of said first and second drive motors such that the tension and length of the tape wound onto said first spool are within predetermined specification.

40. Cassette loading apparatus as recited in claim 30, and further comprising:

pneumatic supply actuator and control means for actuating and controlling the operation of said transport means, said first and second cutter means, said first and second splicer means, said extracting means, and said first and second pickup means.

41. Cassette loading apparatus as recited in claim 1 wherein the extraction means includes means for holding the loop as said transport means carries said cassette to said second work station, said extraction means being operative to cause said tape leader to be engaged by said holder means.

42. Cassette loading apparatus as recited in claim 41, wherein said extraction means includes a tape leader engaging head means moveable from an engaging position to an extracting position said head means having a vacuum opening for holding said tape leader in engagement therewith as it moved from said engaging position to said extracting position.

43. Cassette loading apparatus as recited in claim 42, and further including:

finger means for engaging a portion of the tape leader loop extracted from said cassette and holding it in a predetermined position,
and said head means for rotating for twisting another portion of the extracted tape leader loop, the other portion being received by said holder means with its normally inside face facing outwardly.

44. Cassette loading apparatus as recited in claim 43, wherein said holder means includes an anvil located behind the twisted portion of tape leader and wherein said cutter means comprises a pivotal arm having a cutting edge at its distal end and means for pivoting the arm, swinging its cutting edge into engagement with the anvil severing said twisted portion of tape leader as said cutting edge strikes said anvil.

45. Cassette loading apparatus as recited in claim 43, wherein said means for holding the loop includes a pin means extensible across said vacuum opening to thread and hold said loop of tape leader within the head means.

46. Cassette loading apparatus as recited in claims 14 or 41, and further comprising:

means disposed at said first work station for engaging said first spool to wind all available leader onto said first spool before said leader is extracted.

47. Cassette loading apparatus as recited in claim 1, wherein each splicing means includes:

means for carrying a supply of splicing tape,
a multifacited splicing wheel adapted to carry segments of said splicing tape on its several faces, said wheel being moveable between a retracted position and a splicing position wherein one of said faces carries a segment of said splicing tape into engagement with the butted ends of said leader and said tape.

48. Cassette loading apparatus as recited in claim 47, wherein each splicing means further includes cutting means for cutting said splicing tape into said segments.

49. Cassette loading apparatus as recited in claim 48, wherein each splicing means includes means for sequentially indexing each of the faces of said splicing wheel into a splicing position.

50. Cassette loading apparatus as recited in claim 49, wherein said splicing wheel includes vacuum means for holding said segments of said splicing tape to said faces until they are transferred to a leader to tape junction.

51. Cassette loading apparatus as recited in claim 1, wherein said tape supply means includes a guide arm for guiding said recording tape and for positioning the second cut end thereof in aligned, butting relationship with the cut end of said first leader segment at said third work station.

52. Cassette loading apparatus as recited in claim 2 and further comprising:

indexing means for indexing said rotatable platform about said first axis and including a lever arm, an actuator attached to one end of said lever arm, and one-way clutch means coupling the other end of said lever arm to said platform wherein each activation of said actuator causes said platform to rotate from one work station position to another.

* * * * *